(12) United States Patent
Javidi et al.

(10) Patent No.: US 10,706,258 B2
(45) Date of Patent: Jul. 7, 2020

(54) SYSTEMS AND METHODS FOR CELL IDENTIFICATION USING LENS-LESS IMAGING

(71) Applicant: University of Connecticut, Farmington, CT (US)

(72) Inventors: Bahram Javidi, Storrs Mansfield, CT (US); Adam Markman, Orange, CT (US); Siddharth Rawat, Mansfield, CT (US); Satoru Komatsu, Mansfield, CT (US)

(73) Assignee: University of Connecticut, Farmington, CT (US)

( * ) Notice: Subject to any disclaimer, the term of this patent is extended or adjusted under 35 U.S.C. 154(b) by 159 days.

(21) Appl. No.: 15/902,655

(22) Filed: Feb. 22, 2018

(65) Prior Publication Data
US 2018/0247106 A1 Aug. 30, 2018

Related U.S. Application Data

(60) Provisional application No. 62/461,939, filed on Feb. 22, 2017.

(51) Int. Cl.
| | |
|---|---|
| *G06K 9/00* | (2006.01) |
| *G02B 21/06* | (2006.01) |
| *G02B 21/36* | (2006.01) |
| *G06K 9/66* | (2006.01) |
| *G06K 9/20* | (2006.01) |
| *G02B 5/02* | (2006.01) |
| *G02B 21/00* | (2006.01) |

(52) U.S. Cl.
CPC ....... *G06K 9/00134* (2013.01); *G02B 5/0278* (2013.01); *G02B 21/0008* (2013.01); *G02B 21/06* (2013.01); *G02B 21/365* (2013.01); *G06K 9/00147* (2013.01); *G06K 9/2036* (2013.01); *G06K 9/66* (2013.01)

(58) Field of Classification Search
CPC combination set(s) only.
See application file for complete search history.

(56) References Cited

U.S. PATENT DOCUMENTS

| | | | |
|---|---|---|---|
| 4,555,179 | A | 11/1985 | Langerholc et al. |
| 5,299,035 | A | 3/1994 | Leith et al. |
| 5,371,368 | A | 12/1994 | Alfano et al. |
| 6,215,587 | B1 | 4/2001 | Alfano et al. |

(Continued)

OTHER PUBLICATIONS

Yoo, et al., "Imaging Through a Scattering Wall Using Absorption," Opt. Lett. 16, 1068-1070 (1991) (3 Pages).

(Continued)

*Primary Examiner* — Alex Kok S Liew
(74) *Attorney, Agent, or Firm* — Michael Best & Friedrich LLP

(57) ABSTRACT

Embodiments of the present disclosure include systems and methods for cell identification using a lens-less cell identification sensor. Randomly distributed cells can be illuminated by a light source such as a laser. The object beam can be passed through one or more diffusers. Pattern recognition is applied on the captured optical signature to classify the cells. For example, features can be extracted and a trained classifier can be used to classify the cells. The cell classes can be accurately identified even when multiple cells of the same class are inspected.

20 Claims, 15 Drawing Sheets

(56) References Cited

U.S. PATENT DOCUMENTS

| | | | | |
|---|---|---|---|---|
| 2003/0182013 | A1* | 9/2003 | Moreas | G01N 21/8901 |
| | | | | 700/145 |
| 2005/0126505 | A1* | 6/2005 | Gallager | G02B 27/52 |
| | | | | 119/234 |
| 2006/0114553 | A1* | 6/2006 | Laudo | B01L 9/06 |
| | | | | 359/368 |
| 2014/0133702 | A1* | 5/2014 | Zheng | G06K 9/00624 |
| | | | | 382/103 |
| 2016/0305883 | A1* | 10/2016 | Betzig | G02B 21/16 |

OTHER PUBLICATIONS

Leith et al. "Imaging Through Scattering Media With Holography," J. Opt. Soc. Am. A9, 1148-1153 (1992) (6 Pages).
Thompson et al., "Imaging in Scattering Media by Use of Laser Speckle," J. Opt. Soc. Am. A 14, 2269-2277 (1997) (9 Pages).
Ando, et al., "Speckle-Learning-Based Object Recognition Through Scattering Media," Opt. Express 23, 33902-33910 (2015) (9 Pages).
Wu et al. "Hiding Scattering Layers For Noninvasive Imaging of Hidden Objects," Scientific Reports vol. 5, 8375 (2015) (5 Pages).
Tanzid et al. "Absorption-Induced Image Resolution Enhancement in Scattering Media," ACS Photonics. (2016) (7 Pages).

\* cited by examiner

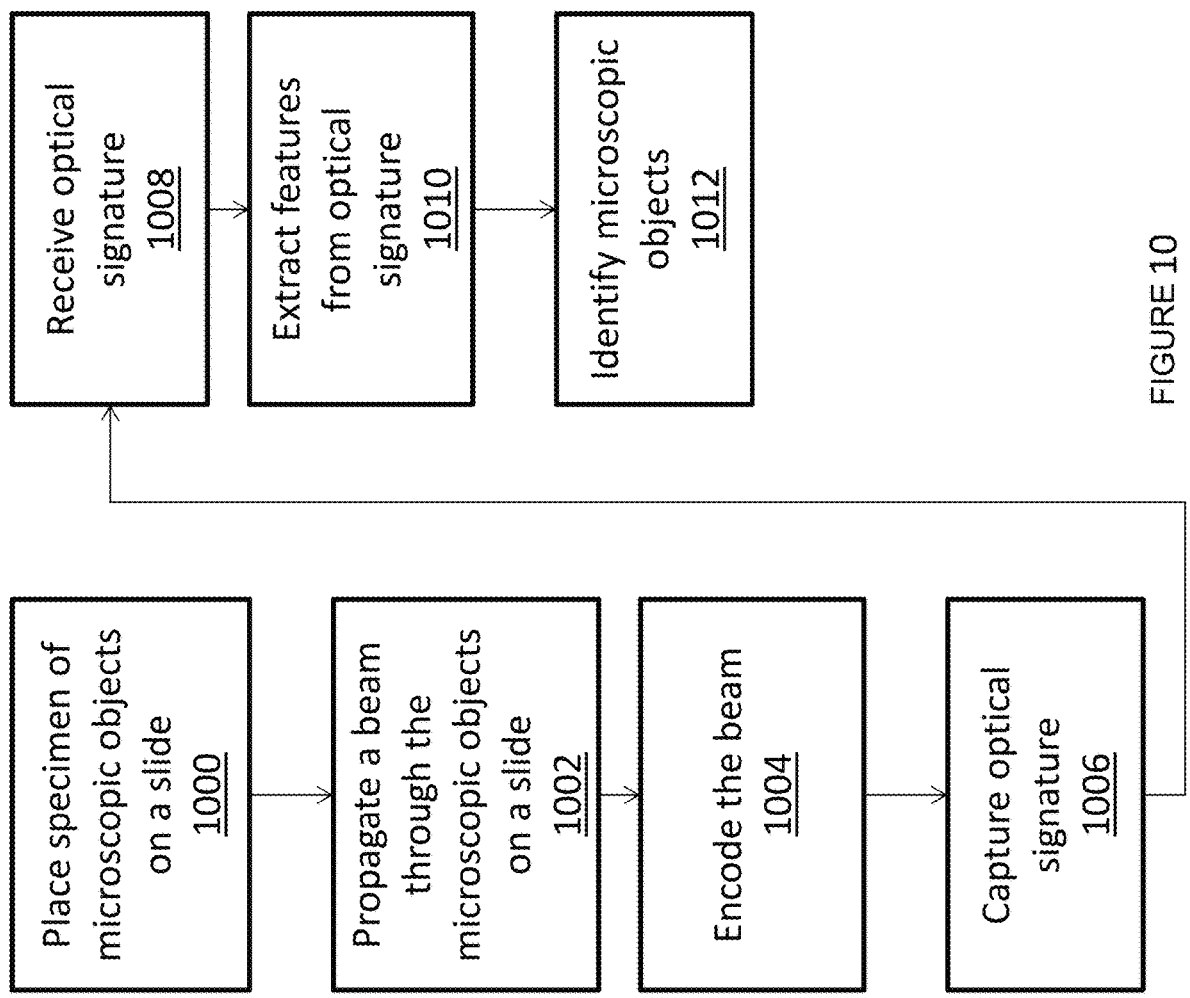

SYSTEMS AND METHODS FOR CELL IDENTIFICATION USING LENS-LESS IMAGING

CROSS-REFERENCE TO RELATED PATENT APPLICATION

This application claims priority to U.S. Provisional Application No. 62/461,939 filed on Feb. 22, 2017, the content of which is hereby incorporated by reference in its entirety.

STATEMENT OF GOVERNMENT INTEREST

This invention was made with Government support under Contract No. ECCS1545687 awarded by the National Science Foundation. The Government has certain rights in the invention.

FIELD OF THE DISCLOSURE

The present disclosure relates to a portable and low-cost imaging system used for cell identification that does not require any lenses. Cell identification is automatically performed on the image recorded from the system.

BACKGROUND OF THE DISCLOSURE

Low cost cell-identification systems are critical in places with a dearth of resources and limited access to healthcare facilities, such as impoverished nations. To determine if a person suffers from a disease, such as Malaria or Sickle Cell diseases, there are a myriad of approaches including antigen detection methods with a follow up test which requires imaging a blood smear, biomolecular analysis, imaging a blood smear using microscopy, digital holographic microscopy, etc. These methods require specialized equipment, are time consuming and expensive, or require follow up tests.

The following disclosure introduces a simple, low cost lens-less imaging system used to image cells placed on glass slides. Cell identification can then be performed on the recorded image to determine cells present on the slide.

The systems and methods of the present disclosure address the shortcomings of the prior art.

SUMMARY OF THE DISCLOSURE

Embodiments of the present disclosure include systems and methods for cell identification using a lens-less cell identification sensor. A microscope glass slide containing the sample can be inputted into the single or double random phase encoding system, which is then illuminated by a coherent or partially coherent light source generating a unique opto-biological signature that is captured by an image sensor. Statistical features such as mean, standard deviation (SD), skewness, kurtosis, entropy, and Pearson's correlation-coefficient are extracted from the opto-biological signatures and used for cell identification with the random forest classifier. Features can be extracted in both the spatial and frequency domains. The proposed systems are compact as they are lens-less and do not have spatial frequency bandwidth limitations due to the numerical aperture of a microscope objective lens. Cell identification is possible using both the single random phase encoding (SRPE) and double random phase encoding (DRPE) systems.

DRPE systems can been shown to produce a white and wide sense stationary signal the DRPE may be a more robust system and may improve classification performance with algorithms that work well with wide sense stationary signals.

Additionally, the lens-less random phase encoding approach does not require cell reconstruction or segmentation, thus it may be computationally less expensive and allow for rapid cell identification. The lens-less system can provide a small form factor, and the absence of spatial frequency bandwidth limitations imposed by the numerical aperture of the microscope objective or magnifying lens. By using a single random phase encoding (SRPE) or double random phase encoding (DRPE) system, the high spatial frequencies of the illuminated multiple cells can be captured due to the modulation of light passing through a single or cascaded (double) diffuser system. Once the opto-biological signature has been recorded, feature extraction is performed and the features are inputted into a pre-trained random forest classifier for classification.

The disclosed method and system uses lens-less imaging with pseudo-random phase encoding with low cost diffusers and image sensors. This approach allows cell identification without expensive optics, spatial light modulators, and expensive lenses and optical components. Moreover, and it is compact, field portable, and a low-cost system. The disclosed system utilizing a compact and low cost blood cell diagnosis system using lens-less imaging with pseudo-random phase encoding can have broad applications to automated disease identification, cell identification, monitoring of medical conditions at home, etc.

In exemplary embodiments, a lens-less microscopic object identification system includes a platform configured to support one or more microscopic objects. The platform can be a microscope slide. A coherent or partially coherent light source is disposed with respect to the platform and is configured to propagate a beam through the one or more microscopic objects disposed on the platform. Diffusers are disposed with respect to the platform and are configured to encode the beam, in response to the beam passing through the one or more diffusers. The encoded beam can include an optical signature of the microscopic objects. An image sensor is disposed with respect to the one or more diffusers and is configured to capture an optical signature of microscopic objects included in the encoded beam. A computing system is connected to the image sensor. The computing system is configured to receive the optical signature of the microscopic objects in the encoded beam, extract features from the optical signature and identify the one or more microscopic objects based on the extracted features.

The one or more microscopic objects is one or more micro-objects, the image sensor is a CMOS or CCD camera and the light source is coherent or partially coherent illumination. The diffuser is further configured to encode the beam with higher spatial frequency information, in response to the beam passing through the diffuser. The encoding beam generates a pseudo-random phase encoded pattern. The computing system is configured to input the plurality of features into a pre-trained classifier.

In one embodiments, the first diffuser is disposed before the second diffuser and the first and second diffuser are disposed on a cascaded diffuser holder. The first diffuser is configured to encode the beam with spatial frequency information, generating a pseudo-random phase encoded pattern, in response to the beam passing through the first diffuser. The second diffuser is configured to further encode the beam with a double random phase encoded pattern, in response to the pseudo-random phase encoded pattern passing through the second diffuser. Object recognition is used to identify the one or more microscopic objects of the same class using features extracted from an optical signature of the microscopic objects.

In one embodiment, a lens-less microscopic object identification system includes a platform used to support one or more microscopic objects, and a light source disposed with respect to the platform, configured to propagate a beam through the one or more microscopic objects disposed on the platform. The system further includes a first diffuser disposed at a first distance with respect to the platform, configured to encode a pseudo-random encoded pattern of the one or more microscopic objects in the beam in response to the beam passing through the first diffuser and a second diffuser disposed at a second distance with respect to the first diffuser, configured to receive the beam encoded with the pseudo-random encoded pattern of the one or more microscopic objects and encode a double random encoded pattern of the one or more microscopic objects in the beam, in response to the passing through the second diffuser. The double random encoded pattern is an optical signature of the one or more microscopic objects. The system further includes an image sensor disposed at a third distance with respect to the second diffuser, configured to capture the optical signature of the one or more microscopic objects included in the encoded beam. A computing system connected to the image sensor is configured to receive the optical signature of the one or more microscopic objects, perform pattern recognition and classification to identify the one or more microscopic objects, based on the optical signature of the one or more microscopic objects. The image sensor is a lens-less the image sensor is a lens-less image sensor.

Any combination or permutation of embodiments is envisioned. Additional advantageous features, functions and applications of the disclosed assemblies, systems and methods of the present disclosure will be apparent from the description which follows, particularly when read in conjunction with the appended figures. The references, publications and patents listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 10 illustrates a process of identifying microscopic objects, in accordance with an exemplary embodiment.

DETAILED DESCRIPTION OF THE DISCLOSURE

The exemplary embodiments disclosed herein include systems and methods for cell identification using a lens-less cell identification sensor. Randomly distributed cells can be illuminated by laser. The object beam can be passed through one or more diffusers. Features can be extracted and a trained classifier can be used to classify the cells. The cell types can be accurately identified even when multiple cells in the same class are inspected. Therefore, details disclosed herein with reference to exemplary systems/assemblies and associated processes/techniques of assembly and use are not to be interpreted as limiting, but merely as the basis for teaching one skilled in the art how to make and use the advantageous assemblies, systems and methods of the present disclosure.

Cell Identification Using Single Beam Lens-Less Imaging with Pseudo-Random Phase Encoding In one embodiment of the present disclosure, a single beam can propagate through cells and modulated by a pseudorandom phase mask generating a pattern which may carry sufficient information about the cell under inspection for identification. This information can be classified between various classes of microscopic objects, and without the use of imaging optics allowing for a compact and stable system. A variety of robust features are extracted from the optical signatures for cell identification and classification. Statistical properties of captured signatures such as cross-correlation, mean, variance, skewness, kurtosis, and entropy can be extracted from the opto-biological signal. The Random Forest Classifier can be applied to the detected modulated opto-biological signature (OBS) pattern to classify cells and microscopic objects.

Figure 1:
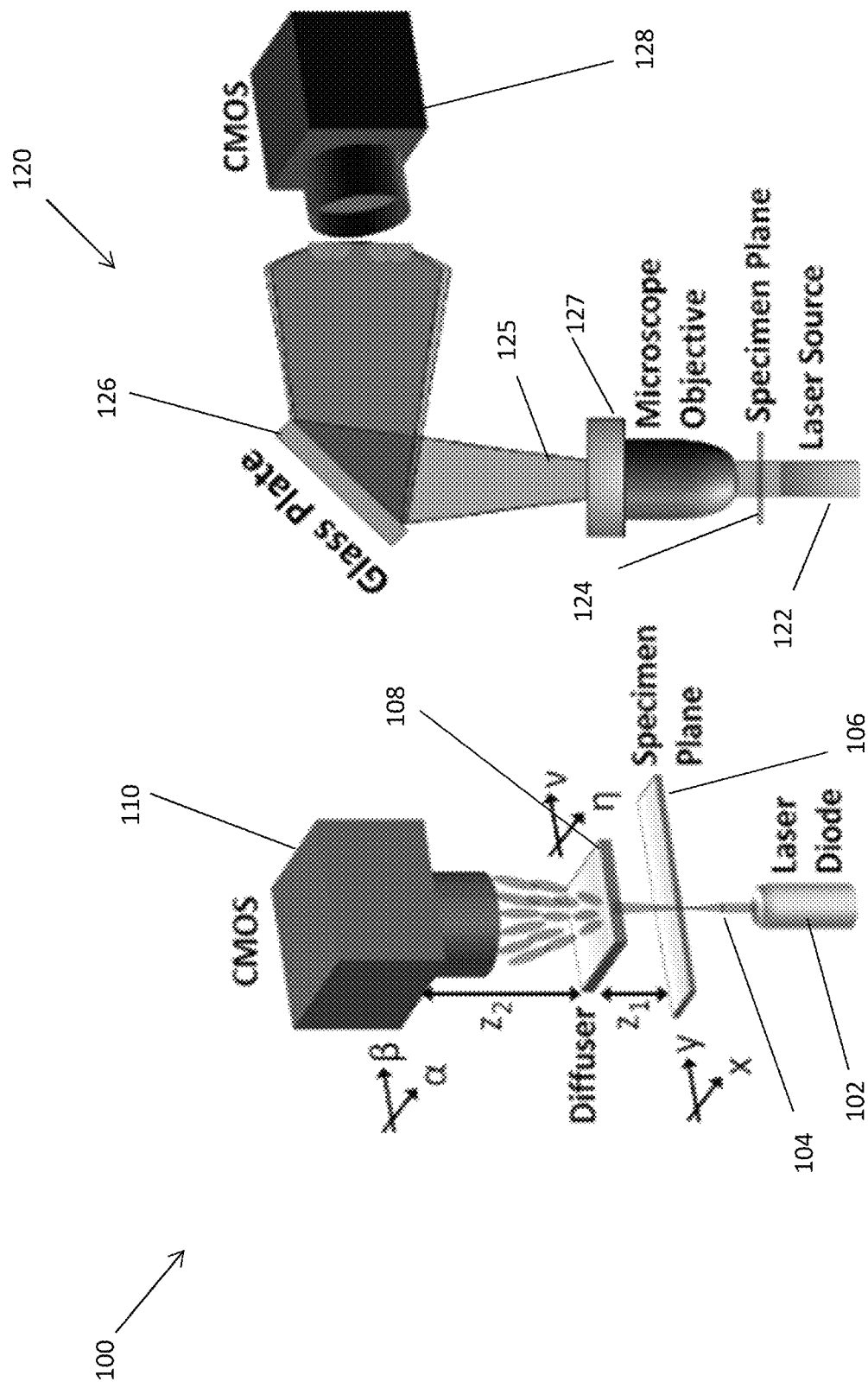
FIG. 1A illustrates a lens-less single beam imaging optical sensor with pseudorandom encoding of the object beam used to record optical signatures from micro-objects for classification, according to an exemplary embodiment.
FIG. 1B illustrates a self-referencing digital holographic microscope in accordance with an exemplary embodiment.

FIG. 1A illustrates the lens-less single beam imaging optical sensor with pseudorandom encoding of the object beam used to record optical-biological (opto-biological) signatures from micro-objects for classification. The system 100 can contain a light source 102, specimen 106, diffuser 108, and an image sensor 110 (e.g., a CMOS or CCD camera). The image sensor 110 can be lens-less. The light source 102 can be a red laser diode module (e.g. Thorlabs CPS635R), which has a collimated wavelength of 635 nm with a maximum output of 1.2 mW and beam 104 diameter 2.9 mm, illuminated a specimen 106 placed on a glass slide. The specimen 106 can be microscopic objects. The beam 104 can be passed through a diffuser a distance $z_1$=2.5 cm away and this signature can be captured by a the image sensor 110 (e.g., CMOS camera) a distance $z_2$=2 cm away from the diffuser. A horizontal arm (not shown in FIG. 1A) can be used with a beam splitter, imaging lens and image sensor 110 (e.g., CMOS camera) for monitoring the microscopic objects for the purpose of cell selection. A two-dimensional (2D) translation stage can be used to select the particular specimen on the slide for inspection and measuring the classification performance.

In the disclosed lens-less imaging system 100, the converging coherent or partially coherent spherical beam can pass through the specimen and can be modulated, which carries information about the specimen. Any un-modulated part of the beam can be regarded as the reference beam. Likewise, part of this waveform may be unmodulated by the diffuser phase mask placed before the image sensor 110 (e.g., CMOS camera). The diffuser 108 can encode the object's higher spatial frequency information into the propagating beam which may be lost otherwise. Finer object features can diffract light at higher spatial frequencies or oblique illuminating angles. Unlike a microscope objective lens which may not collect some of these oblique rays due to its finite numerical aperture, the diffuser 108 allows higher spatial frequencies to be encoded, and the interference between the optical signature of the cell (e.g., the specimen 106) and any unmodulated beam is captured by the image sensor 110 (e.g., CMOS camera or CCD camera).

FIG. 1B illustrates a self-referencing digital holographic microscope, as a comparison to the proposed system (as shown in FIG. 1A). The concept of this microscope is based on the shearing interferometer setup as shown in FIG. 1B. In this setup 120, a coherent laser beam 125 illuminates the object in the specimen plane 124 passing through a microscope objective lens 127, then a fused silica glass plate 126 (4-5 mm thick) splits the beam 125 into two by reflections from the front and back surface of glass plate 126. In FIG. 1B, one beam acts as the object beam and the other beam as a reference beam. Both beams 125 interfere and the holograms are digitally recorded by an image sensor 128. The recorded holograms are reconstructed numerically by simulating the diffraction of reference wave from the acquired micro-objects' hologram by employing scalar diffraction integral.

Figure 2:
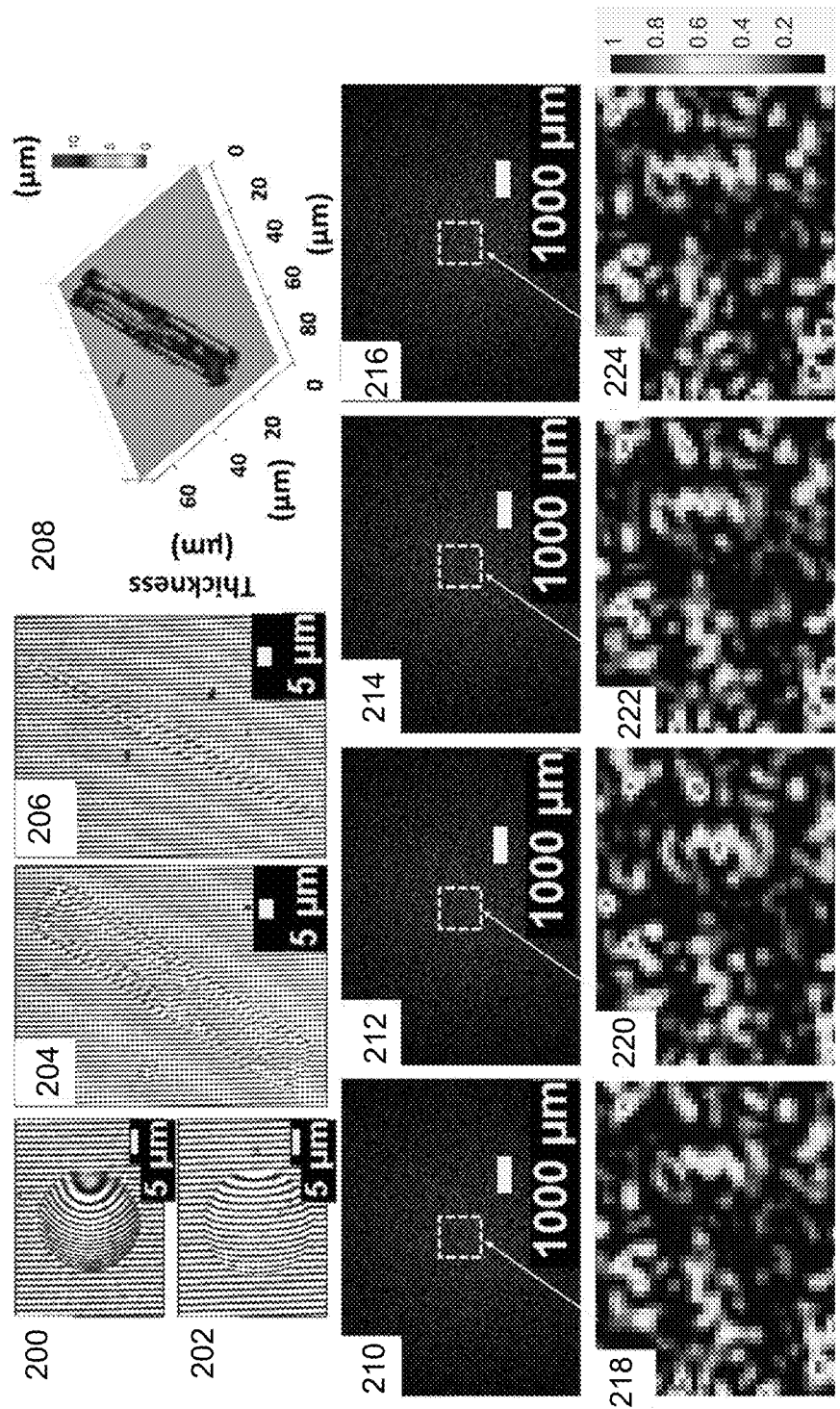
FIG. 2 illustrates optical signatures captured by an image sensor in accordance with an exemplary embodiment.

FIG. 2 illustrates optical signatures captured by an image sensor in accordance with an exemplary embodiment. In FIG. 2, 200-206 depict the recorded digital hologram for the aforementioned classes of micro-objects using the shearing Interferometer setup in FIG. 1B. In FIG. 2, 208 is the three dimensional (3D) reconstruction of Diatom-Tabellaria fenestrata shown in 204. In FIG. 2, 210-216 depicts the recorded opto-biological signature patterns for the classes 20 micrometer (μm) glass bead, 20 μm polystyrene bead, Diatom-tabellaria fenestrate and Diatom-synedra using the proposed lens-less system in FIG. 1A.

The angular spectrum (ASP) approach can be used to mathematically describe the propagation of the object information to the detector plane of the proposed sensor in FIG. 1A. The light complex can be denoted as amplitude leaving the object plane, (x, y), by $u_0(x,y)=|A_{obj}(x,y)|\exp[j\phi_{obj}(x,y)]$ where $\phi_{obj}(x,y)$ is the phase and $A_{obj}(x,y)$ is the amplitude of the object beam, respectively. Using ASP integral, this complex amplitude $u_0$ is propagated to the diffuser plane located at distance $z_1$ from the object plane. The complex amplitude leaving the diffuser plane, (η, ν) is:

$$u_1(\eta,\nu)=\exp(2\pi j\phi_{rand}(\eta,\nu))\times F^{-1}\{F\{u_0(x,y)\}\times G_1\}, \quad (1)$$

where $F\{.\}$ is the Fourier transform, $F^{-1}\{.\}$ is the inverse Fourier transform, λ is the wavelength, $\phi_{rand}(\eta,\upsilon)$, is the random phase modulation generated by the diffuser, and $G_1=\exp\{(j2\pi z_1/\lambda)[1-(\lambda f_x)^2-(\lambda f_y)^2]^{1/2}\}$ is the transfer function of free space propagation for distance $z_1$. The second light propagation from the diffuser plane arriving at the detector plane (α,β), a distance $z_2$ away is:

$$u_2(\alpha,\beta)=F^{-1}\{F\{u_1(\eta,\nu)\}\times G_2\}, \quad (2)$$

where $G_2$ is the transfer function of free space propagation for distance $z_2$.

A spatial shift tolerant system is desirable as it may be difficult to localize every new specimen to the same position in the object plane. To demonstrate shift tolerance, eight optical signatures can be recorded by translating micro-objects in the x-direction (object plane) with a step size/resolution of 0.05 mm, so that the specimen remains in the object beam path. The following micro-objects can be used: 20 μm glass bead, 20 μm polystyrene bead and Diatom-tabellaria fenestrata. The same process can be repeated in the y direction. Cross-correlation coefficients were measured by correlating these optical signature patterns with their signature obtained when there is no object translation by computing the Pearson product-moment correlation coefficient, C, which is a value between −1 and 1:

$$C = \frac{\sum_{k=1}^{K}\sum_{l=1}^{L}[I_R(k,l)-\overline{I_R}][I_M(k,l)-\overline{I_M}]}{\sqrt{\left\{\sum_{k=1}^{K}\sum_{l=1}^{L}[I_R(k,l)-\overline{I_R}]^2\right\}\left\{\sum_{k=1}^{K}\sum_{l=1}^{L}[I_M(k,l)-\overline{I_M}]^2\right\}}}, \quad (3)$$

where (k,l) are pixel coordinates, $I_R(k,l)$ and $I_M(k,l)$ are the intensities of the reference pattern (signature due to the first position) and a test signature, respectively, $\overline{I_R}$ and $\overline{I_M}$ are the mean of a single reference image and test signature, respectively, and K and L are the total number of pixels in the k and l direction, respectively.

Figure 3:
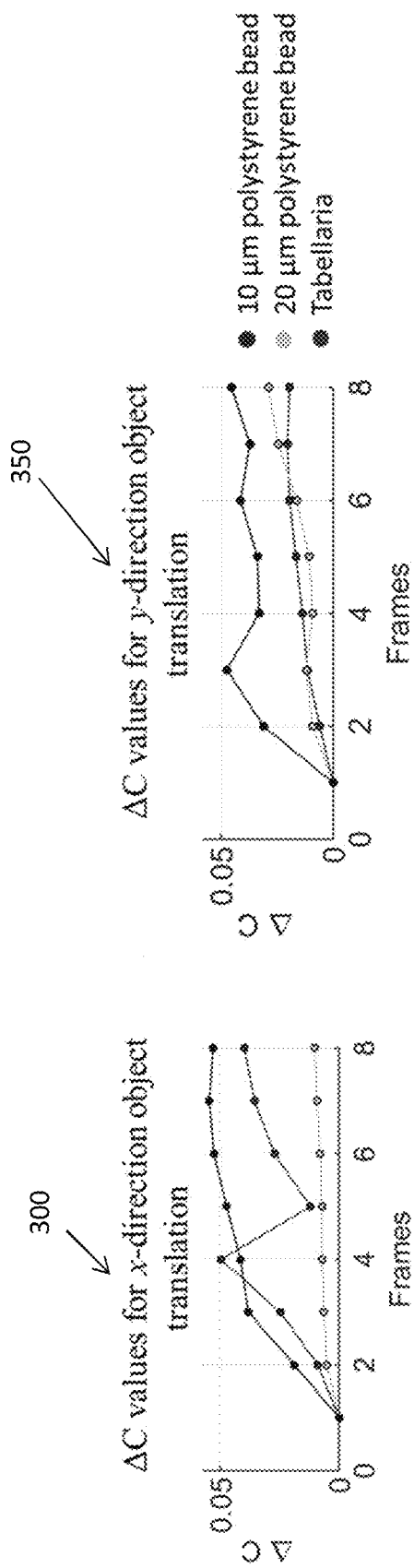
FIG. 3 shows the change in correlation coefficient when a 20 μm polystyrene bead, 10 μm polystyrene bead, and Tabellaria are translated in the x- and y-direction, respectively, in accordance with an exemplary embodiment.

FIG. 3 illustrates a change in correlation coefficients between the optical signatures acquired when there were x and y translations of the micro-objects and their optical signature with x and y translation, respectively. In FIG. 3, ΔC values for x-direction object translation 300 is illustrated. Additionally, ΔC values for y-direction object translation 350 is illustrated. The change in correlation coefficients is ΔC=1-C. Signature patterns of 1620×1220 pixels can be used. The translation of micro-objects in the x and y directions (object plane) may significantly influence C. The ΔC is low and the system is robust to spatial translation of cells in the input plane.

Figures 4A, 4B:
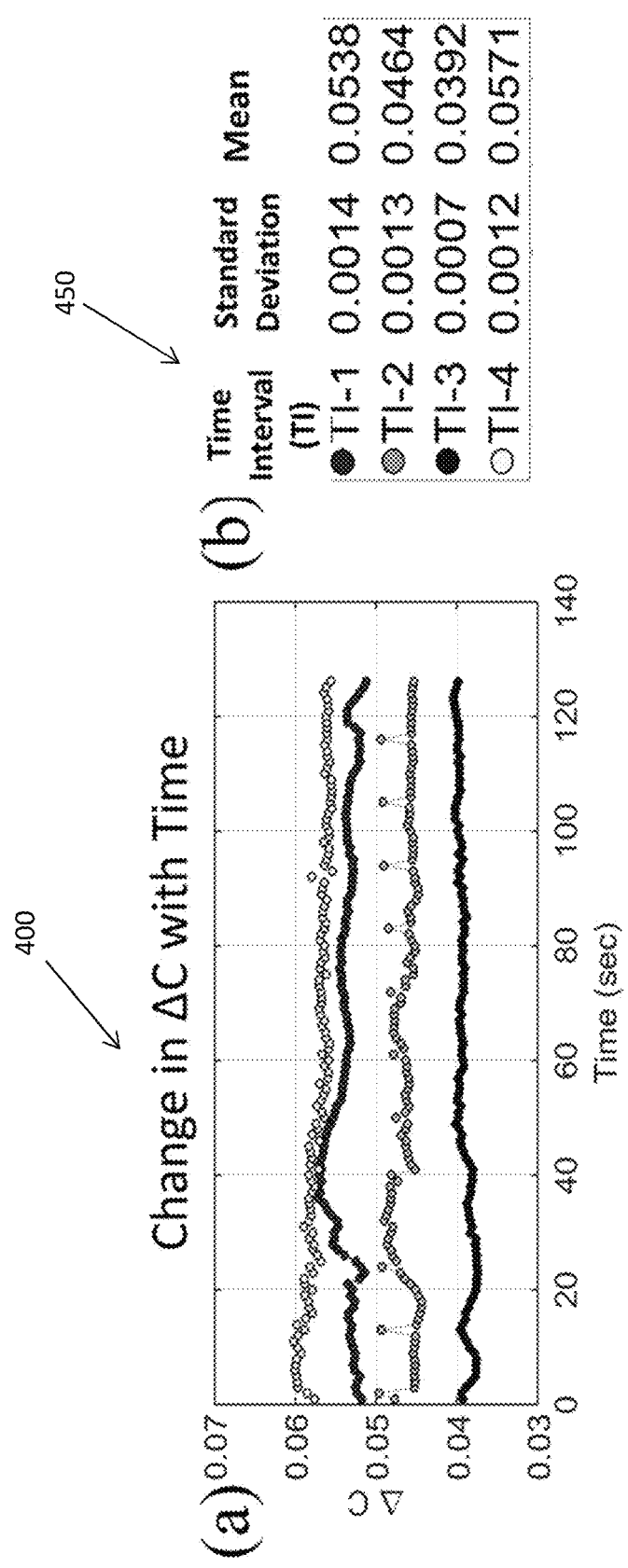
FIG. 4A illustrates the change in correlation coefficient (ΔC) versus time over four different 126 second time intervals denoted as TI-1, TI-2, TI-3 and TI-4 in accordance with an exemplary embodiment.
FIG. 4B illustrates the standard deviation and mean values of ΔC over four different 126 second time intervals denoted as TI-1, TI-2, TI-3 and TI-4 in accordance with an exemplary embodiment.

In a non-limiting example, to examine the temporal stability of the system shown in FIG. 1A, optical signatures can be recorded every 10 minutes for 126 seconds using the glass slide with no object. This can be repeated up to 40 minutes. Then, a single optical signature (reference) can be recorded by removing the glass slide. With reference to FIG. 4A, ΔC changed over time 400 is illustrated. Then these two patterns can be used to determine if ΔC changed over time. FIG. 4B, standard deviation and mean values of ΔC 450 is illustrated. The standard deviations and mean values for these time intervals (TI) can be computed from the values of ΔC which remain low.

Object recognition can be performed on the recorded optical signature from the proposed setup (as shown in FIG. 1A) to classify the cells. A total of five statistical features can be extracted from the captured optical signatures: mean, variance, skewness, kurtosis, entropy. Along with these statistical features, Pearson's correlation coefficient can be calculated between the same class of micro-objects (true class) and between other classes (false class) (as shown by Equation 3).

The random forest (RF) classifier can be chosen for cell identification. The RF classifier used is a supervised, non-parametric classifier that uses bootstrap aggregation, or bagging, of decorrelated decision trees thus creating a "forest". Bagging allows for reduced variance in classification decisions and overfitting. A decision can be reached by taking the "majority vote" from the outputs of the decision trees, which consists of nodes, branches and leaves. A dataset can be created for four classes: 20 μm glass bead, Diatom-tabellaria fenestrata, Diatom-synedra and No-cell (slide with distilled water). Moreover, false class data that did not belong to any of the four classes can be captured. The false class data consisted of optical signatures from epithelial cells (cheek cells) and 20 μm polystyrene beads using the proposed setup (as shown in FIG. 1A). There were 50 optical signatures captured from each true class data (i.e. 200 total) while 50 optical signatures were captured for 20 μm polystyrene bead samples, and 10 optical signatures for epithelial cells. Feature extraction can be performed and the RF classifier can be trained based on the true class data. The true class data can be split such that 30 signatures from each class were used to train the RF classifier and the remaining can be used for testing. For the RF model, 100 decision trees can be used and the Gini diversity index criteria can be used to form the trees. To determine the reliability of the RF classifier, the scores (percentage of trees that voted for that class) can be examined. If the percentage is below 75%, it can be determined that the class output may not reliable be and the data can be of a false class.

Figure 5:
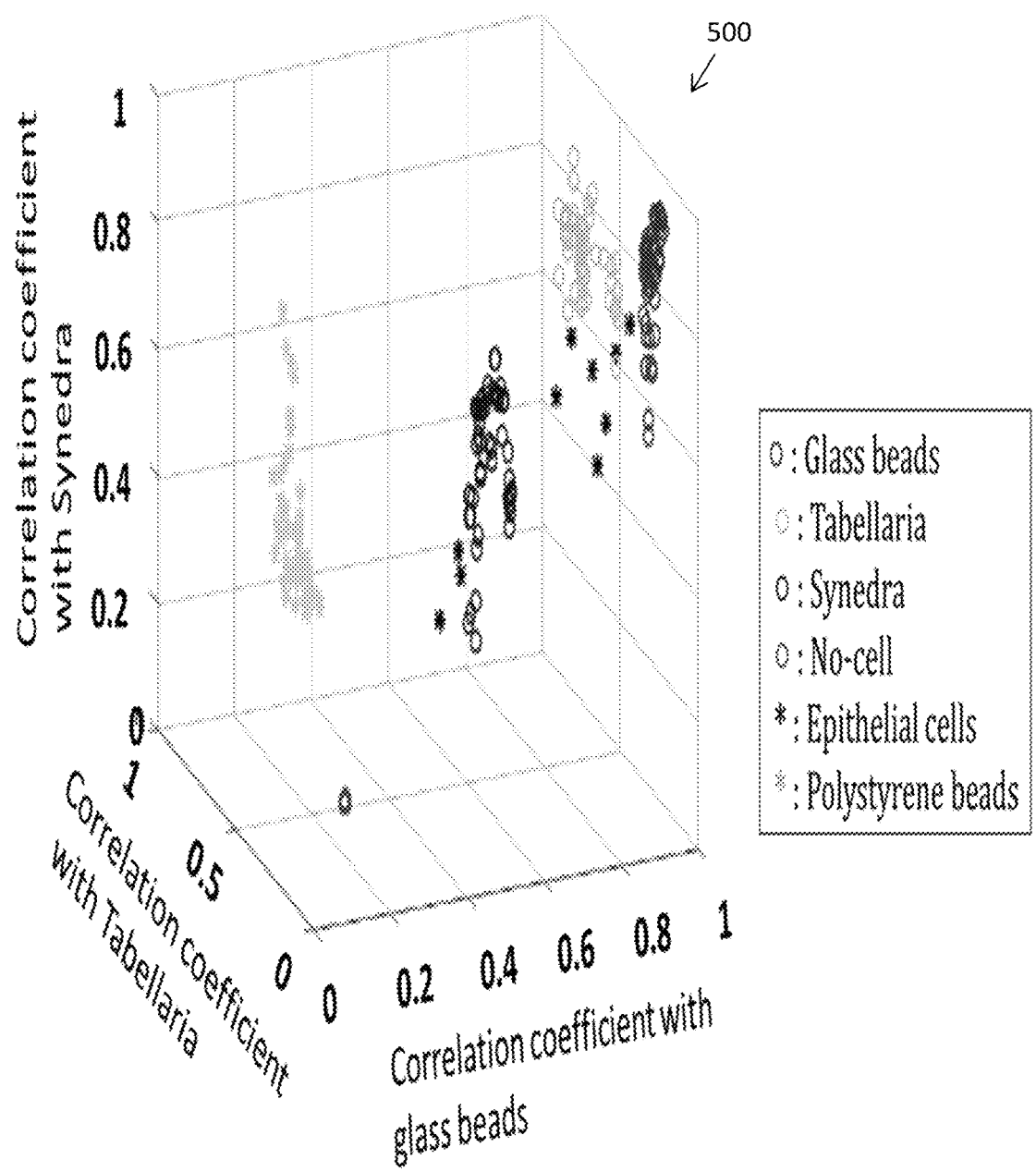
FIG. 5 illustrates a scatter plot of the correlation coefficients between micro-objects in accordance with an exemplary embodiment.

FIG. 5 illustrates a scatter plot 500 depicting the correlation coefficient between a single signature from either 20 μm glass bead, Diatom-tabellaria fenestrata and Diatom-synedra with 140 test signatures from 20 μm glass bead, Diatom-tabellaria fenestrata, Diatom-synedra, 20 μm polystyrene bead, and epithelial cell to show class separation. The x-axis is the correlation coefficient between one selected glass bead optical signature and all the test signatures. The y-axis is the correlation coefficient between Tabellaria's optical signature and all the test signatures. Lastly, the z-axis is the correlation coefficient between Synedra's optical signature and all the test signatures.

Table 1 depicts the confusion matrix for the classifier. The classifier can have an accuracy of 97.9% which is calculated by (TP+TN)/N, where TP is the number of true positives, TN is the number of true negatives and N is the total number of test signatures, which includes false lass objects not trained in the classifier. For comparison, additional micro-objects and cell identification, using support vector machine (SVM) can be performed. For the SVM classifier, a non-linear (Radial Basis Function) kernel with a gamma parameter equal to 1.8 can be used. The signature patterns of 120 true classes were used for training and use the signature patterns of 80 true and 60 false classes for testing. The confusion matrix is shown in Table 1. The accuracy of the SVM classification can be 84.3%.

TABLE 1

Comparison of classification results for random forest (RF) classifier and support vector machine (SVM) for data acquired using proposed imaging setup (FIG. 1(a)).

| 1 Random Forest (RF) Classifier | | | 2 | 3 Support Vector Machine (SVM) | | |
|---|---|---|---|---|---|---|
| 4 | 5 PP | 6 PN | 7 | 8 | 9 PP | 10PN |
| 11TP | 1278 | 132 | 14 | 15TP | 1664 | 1716 |
| 18TN | 191 | 2059 | 21 | 22TN | 236 | 2454 |

TP: true positive,
TN: true negative,
PP: predicted positive,
PN: predicted negative.

For comparison, similar identification processes with the same micro-objects can be repeated using digital shearing interferometer (as shown in FIG. 1B) with a 40× microscope objective lens. The following features can be used: mean physical thickness, coefficient of variations, optical volume, projected area and ratio of projected area, skewness and kurtosis of the cell/micro-object. There can be 200 true and 60 false signatures. For training, 120 true signatures can be used while for testing 80 true and 60 false signatures (total 140) can be used. Table 2 illustrates the results using the RF classifier using 100 trees and a threshold of 0.75 (75%).

TABLE 2

Classification results for RF classifier for data using shearing interferometry (FIG. 1(b)).
25 Random Forest (RF) Classifier.

| | 26 | 27PP | 28PN |
|---|---|---|---|
| 29 | TP | 3074 | 316 |
| 32 | TN | 3310 | 3450 |

TP: true positive, TN: true negative, PP: predicted positive, PN: predicted negative.

The improved performance/classification accuracy of the disclosed system may be attributed to-increased bandwidth and SNR due to the lens-less single beam set up, thus increasing the channel capacity that is, C=BW log (1+SNR) assuming white Gaussian distributed noise, where BW is bandwidth and SNR is signal to noise ratio. The random encoding using the diffuser can increase the space bandwidth product of the system. Moreover, additional optical components such as mirrors, beam splitters, and microscope objective lenses in conventional holographic set ups generate losses in information (BW) due to the limited lens NA, and reduced SNR due to inherent noise in these components. From the viewpoint of amplitude transfer function (ATF) of a diffraction-limited coherent. The imaging system, the NA of microscope objective lenses limit the overall ATF of the system according to $P(\lambda z f_x, \lambda z f_y)$, where $P(.)$ is the lens pupil, f is the focal length, and z is the distance between the lens and the detector plane. However, the ATF of the proposed system as defined by the pseudorandom phase mask is a pseudorandom white process in the detector plane which can have a higher bandwidth than that provided by a microscope objective lens.

Cell Identification Using Lens-Less DRPE

In another embodiment of the present disclosure provides a system including lens-less double-random phase encoding used for cell identification. Double-random phase encoding has been used in optical encryption. In this system, randomly distributed cells are illuminated using a coherent light source. The modulated wavefront can pass through two statistically independent random diffusers spatially separated by a specified distance. The resulting complex optical signature is then captured by an imaging sensor. Feature extraction can be performed and fed into a pre-trained classifier for cell identification. The resulting signature using double-random phase encoding can be white and wide sense stationary. The system can demonstrate more accurate classification results with multiple cells in the specimen plane compared to a single diffuser system.

Figures 6A, 6B:
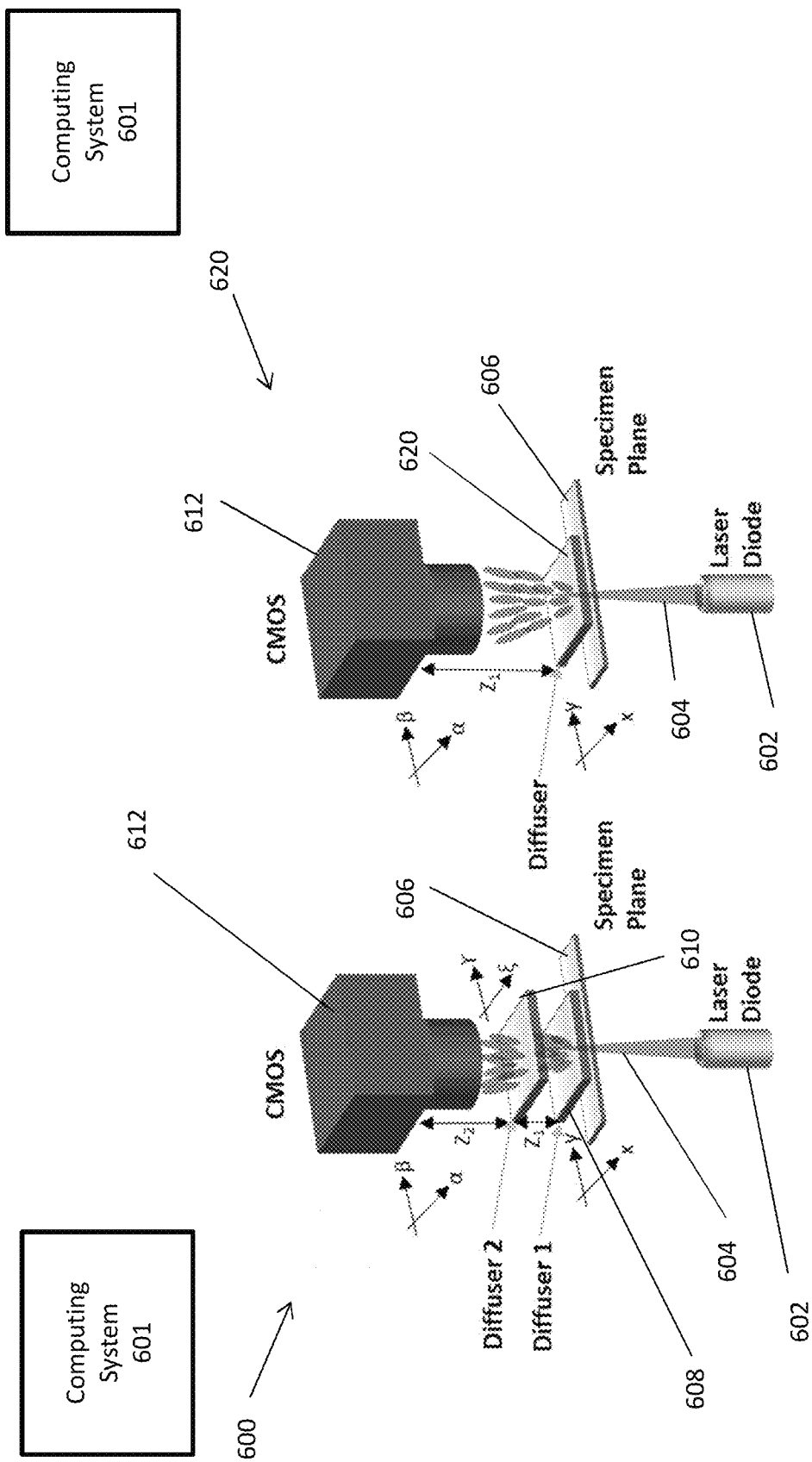
FIG. 6A illustrates a double-random phase encoding (DRPE) system, according an exemplary embodiment.
FIG. 6B illustrates a single diffuser pseudo-random phase (SRPE) encoding system, in accordance with an exemplary embodiment.

With initial reference to FIG. 6A, a DRPE system 600 for recording the opto-biological patterns of micro-objects for cell identification and classification is illustrated. The DPRE system 600 includes a light source 602, a specimen 606, a first and second diffuser 608, 610, and an image sensor 612. As an example, the image sensor 612 can be a CMOS camera and the light source 602 can be a laser diode module which can produce a collimated output having a circular beam profile and operating wavelength of 635 nm. The image sensor 612 can be a lens-less system. The specimen 606 can be microscopic objects. As a non-limiting example, the specimen 606 can be biological cells. The light source 602 can be disposed beneath the specimen 606. The specimen can be disposed beneath the first diffuser 608. The first diffuser 608 can be disposed beneath the second diffuser 610. The second diffuser 610 can be disposed beneath the image sensor 612.

The specimen 606 can be supported on a platform. The platform can be a substrate made of thin glass material, such as a microscope slide. The platform can be transparent. To make the system more compact, a sample glass slide, the cascade of two plastic diffusers and a C-mount can be 3D printed and integrated altogether in a single assembly. In a non-limiting example, this assembly can have dimensions of 75 mm×25 mm×10 mm. The system can be further compacted by using shorter glass slides. The C-mount allows the DRPE system 600 to be attached directly to the CMOS camera. The image sensor 612 can be a lens-less system. A laser beam 604 can be propagated from the light source 602 from beneath the specimen 604. The laser beam 604 can illuminate the slide containing the specimen 606 (i.e., cells of a particular class), which can be randomly distributed. The complex field containing the information associated with the specimen 606 can pass through the first diffuser 608. As a non-limiting example, the first diffuser can be about 1 mm from the specimen 606. The separation between the first diffuser 608 and the specimen 606 can be minimal to encode the highest spatial frequencies possible. This process generates a pseudo-random phase encoded pattern containing the specimen's information which then passes through the second diffuser 610. As a non-limiting example, the second diffuser can be located at a distance $z_1=4$ mm. The opto-biological signature patterns diffracted by the second diffuser 610 is white and stationary in nature as described herein, can be captured by the image sensor 612. The opto-biological signature patterns containing information associated with the specimen 606 (i.e., cells) can be an unique opto-biological signature of the specimen 606. As a non-limiting example, the image sensor 612 can be located at a distance $z_2=16$ mm from the second diffuser 610. The distances $z_1$ and $z_2$ can be selected in such a way to capture the opto-biological signature patterns and to adequately sample the signatures.

With reference to FIG. 6B, the single random phase encoding (SRPE) system 620 is illustrated. The SRPE 620 system can include a single diffuser. The SRPE system 620 can include a light source 602, a specimen 606, a diffuser 622, and an image sensor 612. As an example, the image sensor 612 can be a CMOS camera and the light source 602 can be a laser diode module which can produce a collimated output having a circular beam profile and operating wavelength of 635 nm. The image sensor 612 can be a lens-less system. The specimen 606 microscopic objects. As a non-limiting example, the specimen 606 can be biological cells. The light source 602 can be disposed beneath the specimen 606. The specimen can be disposed beneath the diffuser 622. The diffuser 622 can be disposed beneath the image sensor 612. The single diffuser 622 set up can be 3D printed, but without the second diffuser. In the single diffuser case, the distance between the single diffuser and the image sensor can be $z_1=20$ mm.

Figure 6C:
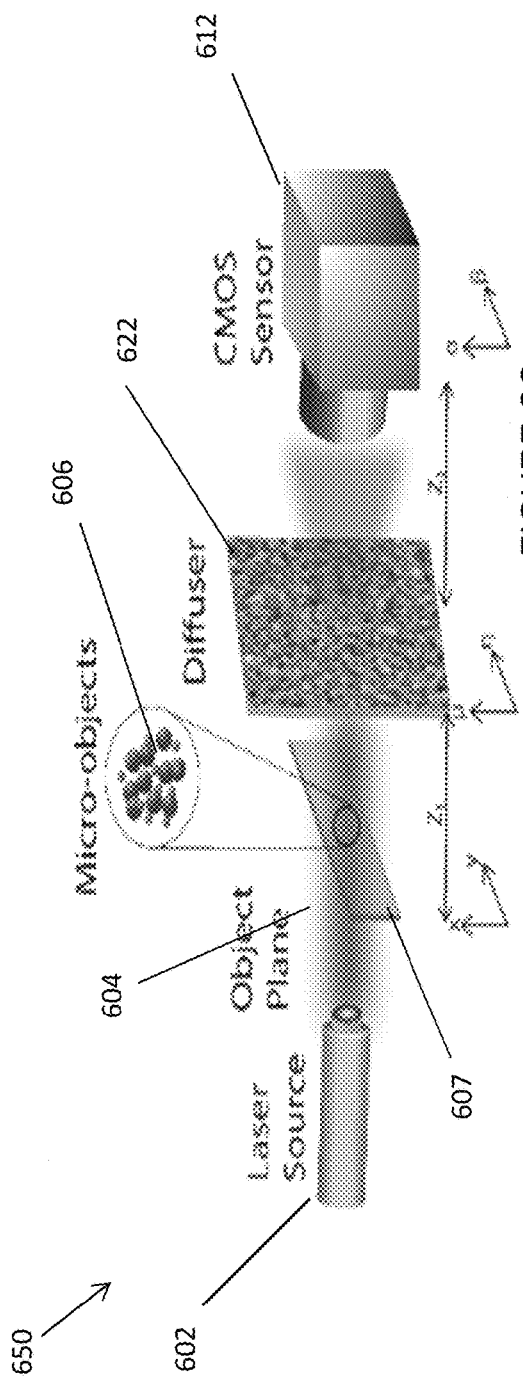
FIG. 6C illustrates a single diffuser pseudo-random phase (SRPE) encoding system, in accordance with an exemplary embodiment.

FIG. 6C illustrates a SRPE system 650 in accordance with an exemplary embodiment. The SRPE system 650 can include a light source (or laser source) 602, a specimen 606, a single diffuser 622 and an image sensor 612. The specimen 604 can be micro-object placed on an object plane. A laser beam 604 can be propagated through the specimen 606, illuminating the specimen 604. As mentioned above, the specimen 606 can be supported by a platform 607 such as a microscope slide. A complex field containing information associated with the specimen 606 can pass through the single diffuser 622, in response to the laser beam 604 illuminating the specimen 606. The single diffuser 622 can encode high spatial frequencies of the specimen 606. As discussed above, with reference to FIGS. 6A-B, this process can generate a pseudo-random phase encoded pattern containing information associated with the specimen 606. The image sensor 612 can record the pseudo-random phase encoded pattern containing information associated with the specimen 606. The pseudo-random phase encoded pattern containing information associated with the specimen 606, can be a unique opto-biological signature of the specimen 606. The information associated with the specimen 604 can be propagated from the object plane to the image sensor plane. The diffuser 622 can be disposed at a distance of $z_1$ (e.g., about 1 mm) from the specimen 604. The image sensor 612 can be disposed at a distance of $z_2$ from the diffuser 622.

Figure 6D:
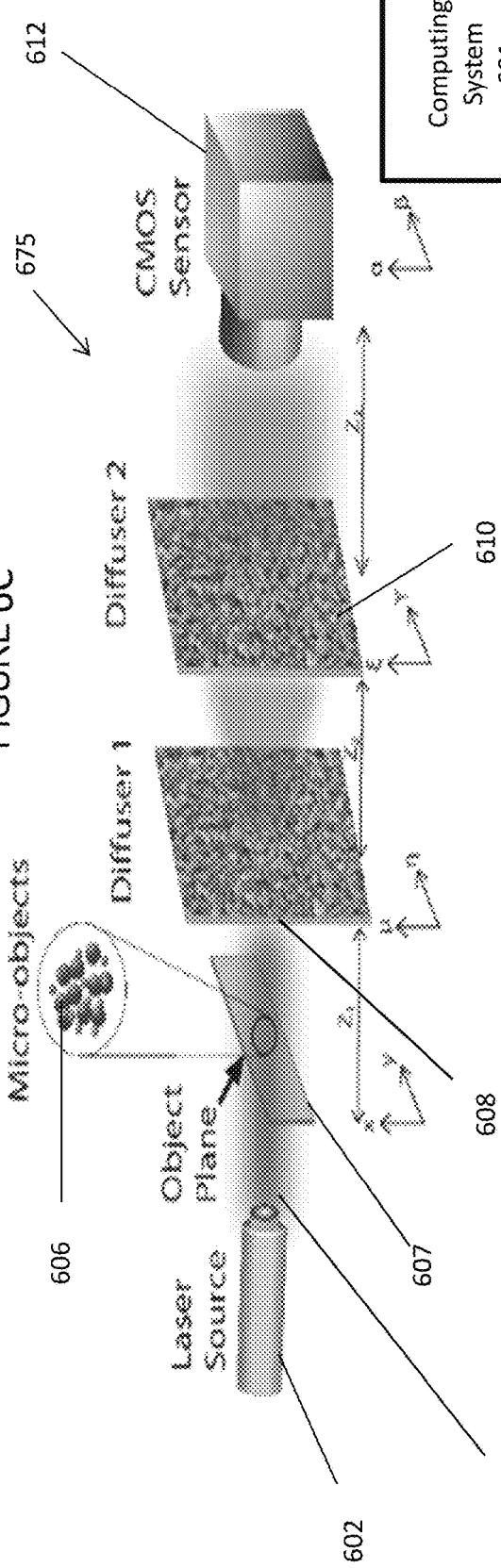
FIG. 6D illustrates a DRPE system for object identification, according an exemplary embodiment.

FIG. 6D illustrates a DRPE system 675 in accordance with an exemplary embodiment. The DRPE system 600 includes a laser source (or light source) 602, a specimen 606, a first and second diffuser 608, 610, and an image sensor 612. The specimen 606 can be microscopic objects disposed on an object plane. As mentioned above, the specimen 606 can be supported by a platform 607 such as a microscope slide. The image sensor 612 can be disposed on an image sensor plane. The second diffuser 610 is disposed on a plane parallel to the first diffuser 608. The light field containing the object information can be further randomized by the second diffuser 610. The final complex field intensity (i.e., the double random phase encoded pattern containing information associated with the specimen 606) is captured at the image sensor plane. The distance from the specimen 606 to the first diffuser 608 can be $z_1$. The distance from the first diffuser to the second diffuser 610 can be $z_2$. The distance from the second diffuser 610 to the image sensor can be $z_3$. The double random phase encoded pattern containing information associated with the specimen 606, can be the an opto-biological signature of the specimen 606. It can be appreciated that in the DRPE system 675, the beam 604 can be encoded in two separate planes to make the opto-biological signatures wide sense stationary. The opto-biological signatures can be more robust to object (cells) translations and multiple cells in the field of view can be analyzed. In a non-limiting example, $z_2$ is set to 30 mm, and $z_3$ is set to 16 mm.

With reference to FIGS. 6A-D, the SRPE systems (e.g., SRPE system 620, 650 as shown in FIG. 6B and FIG. 6C) and the DRPE systems (e.g., DRPE system 600, 675 as shown in FIG. 6A and FIG. 6D) can be in communication with a computing system 601. The computing system 601 can receive the unique opto-biological signature containing information associated with the specimen (e.g., the specimen 604 as shown in FIGS. 6A-D). The computing system 601 can extract features from the opto-biological signature and identify the one or more microscopic objects using a pre-trained classifier trained on the features. The computing system 601 can perform pattern recognition and classification to identify the one or more microscopic objects.

In an example embodiment, the SRPE and/or DRPE systems can be connected to the computing system 601 via a communications network. The communications network can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Alternatively, or in addition to, the SRPE and/or DRPE systems can be directed connected to the computing system 601.

Figure 7:
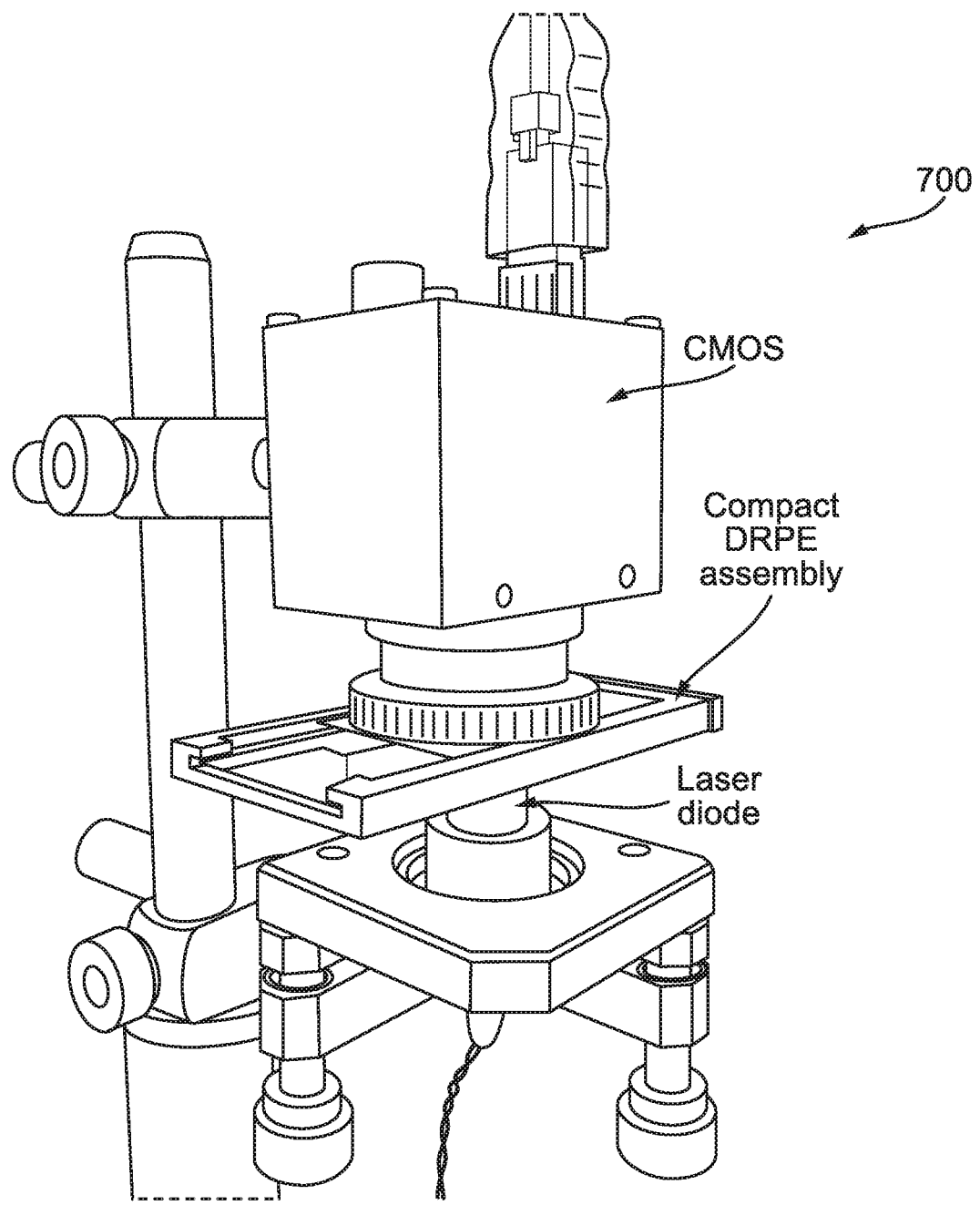
FIG. 7 illustrates a system for DRPE cell identification, in accordance with an exemplary embodiment.
Figure 8A:
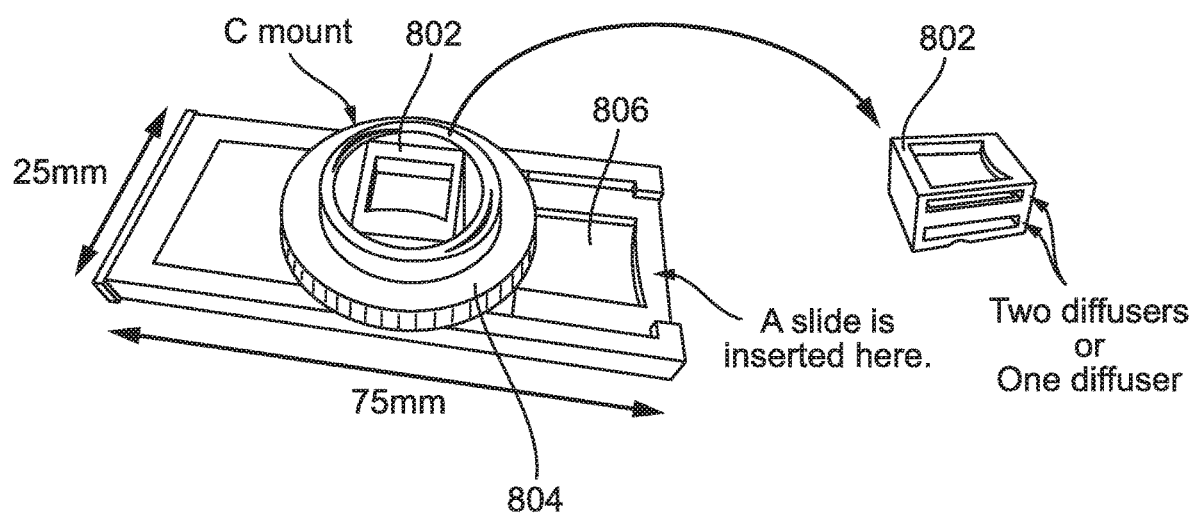
FIGS. 8A-B illustrate a set up for a 3D printed double-random phase encoding (DRPE) with C-mount adapter, cascaded diffusers holder, and a schematic of the DRPE system with two cascaded diffusers placed above the slide, in accordance with an exemplary embodiment.
Figure 8B:
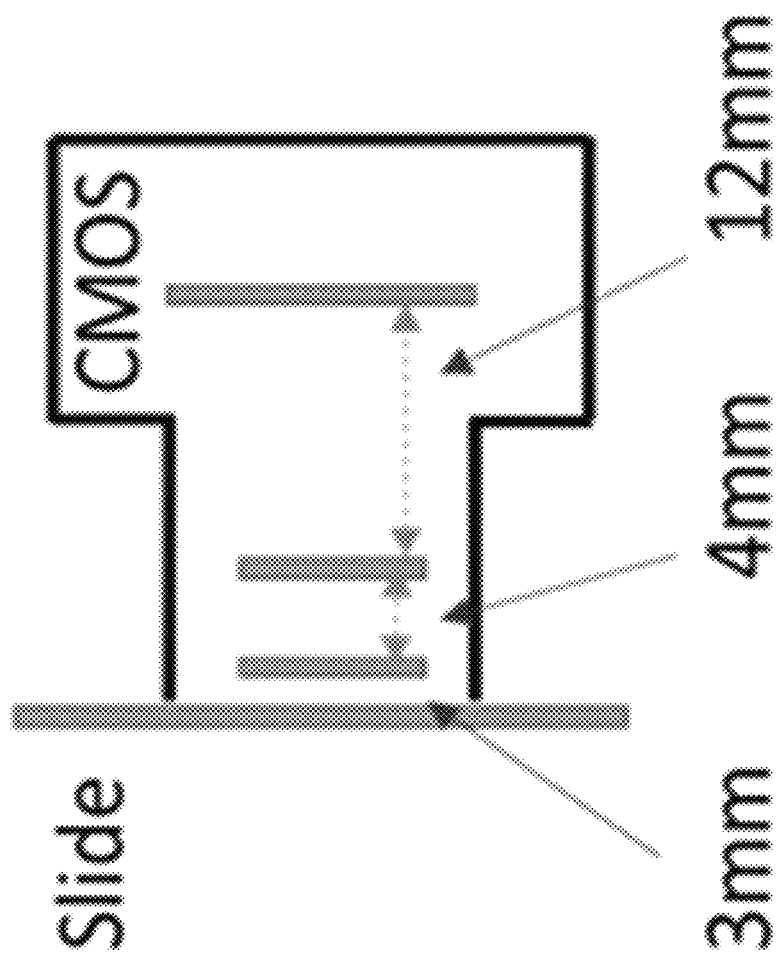

With reference, to FIG. 7, an exemplary system 700 for DRPE cell identification is illustrated. The system 700 can include a CMOS camera, compact DRPE assembly, and a laser diode. With reference to FIGS. 8A-B, a system for a 3D printed double-random phase encoding (DRPE) with C-mount adapter, cascaded diffusers holder, and a schematic of the DRPE system with two diffusers placed at about 1 mm and 4 mm from the slide is illustrated. With reference to FIG. 8A the 3D printed housing 802 for holding the diffusers is shown integrated with C-mount adapter 804 to hold the image sensor. A slide supporting the specimen can be inserted into the slot 806. The 3D printed holder 802 can hold and store single and double diffusers. FIG. 8B depicts a schematic showing the working principle of the 3D printed system shown in FIG. 7.

The diffraction and propagation of the object from the specimen plane to the image sensor plane can be analyzed. The complex transmittance function of the cells or micro-objects can be $u_0(x,y)=|A_{obj}(x,y)|\exp[j\phi_{obj}(x,y)]$, where $A_{obj}(x,y)$ and $\phi_{obj}(x,y)$ are the amplitude and phase of the microscopic objects, respectively. The first diffuser can be placed close to the specimen (~1 mm). The Fresnel number can be sufficiently low for the second diffuser to be the in Fraunhofer domain. The complex field arriving at the first diffuser is:

$$u_1(\mu, \eta) = \int_{-\infty}^{\infty}\int_{-\infty}^{\infty} u_0(x, y)h_1(\mu - x, \eta - y)dxdy, \quad (4)$$

where the convolution kernel of this field is:

$$h_1(\mu, \eta) = \frac{e^{jkz_1}}{j\lambda z_1}\exp\left[\frac{jk}{2z_1}(\mu^2 + \eta^2)\right], \quad (5)$$

where $k=2\pi/\lambda$, and $\lambda$ is the light source wavelength. Therefore, the field exiting the diffuser 1 is multiplied by the random phase $\phi_1(\mu,\eta)$ of diffuser 1 and is given by:

$$u_2(\mu,\eta)=u_1(\mu,\eta)\exp[j7\pi\phi_1(\mu,\eta)]. \quad (6)$$

The field $u_2(\mu,\eta)$ is then propagated by distance $z_2$. In the SRPE case, the image sensor is located in this plane and the field intensity captured by the image sensor is the opto-biological signature for the SRPE system.

In the DRPE system, the diffuser 2 plane $(\xi,\gamma)$ is located a distance $z_2$ from the diffuser 1. In this case, the complex field arriving in the plane of second diffuser [see FIG. 1(b)] which is located at a distance $z_2$ from the first diffuser is:

$$u_3(\xi, \gamma) = \int_{-\infty}^{\infty}\int_{-\infty}^{\infty} u_2(\mu, \eta)h_2(\xi - \mu, \gamma - \eta)d\mu d\eta, \quad (7)$$

where the convolution kernel of this field is given as:

$$h_2(\xi, \gamma) = \frac{e^{jkz_2}}{j\lambda z_2}\exp\left[\frac{jk}{2z_2}(\xi^2 + \gamma^2)\right], \quad (8)$$

The complex field exiting the second diffuser plane $(\xi,\gamma)$ is:

$$u_4(\xi,\gamma)=u_3(\xi,\gamma)\exp[j2\pi\phi_2(\xi,\gamma)], \quad (9)$$

where $\phi_2(\xi,\gamma)$ is the random phase modulation generated by the second diffuser. The light arriving at the image sensor plane $(\alpha,\beta)$ located at a distance $z_3$ from the second diffuser is:

$$u_5(\alpha, \beta) = \int_{-\infty}^{\infty}\int_{-\infty}^{\infty} u_4(\xi, y)h_3(\alpha - \xi, \beta - \gamma)d\xi d\gamma, \quad (10)$$

where the convolution kernel of this field is:

$$h_3(\alpha, \beta) = \frac{e^{jkz_3}}{j\lambda z_3}\exp\left[\frac{jk}{2z_3}(\alpha^2 + \beta^2)\right]. \quad (11)$$

Figure 9A:
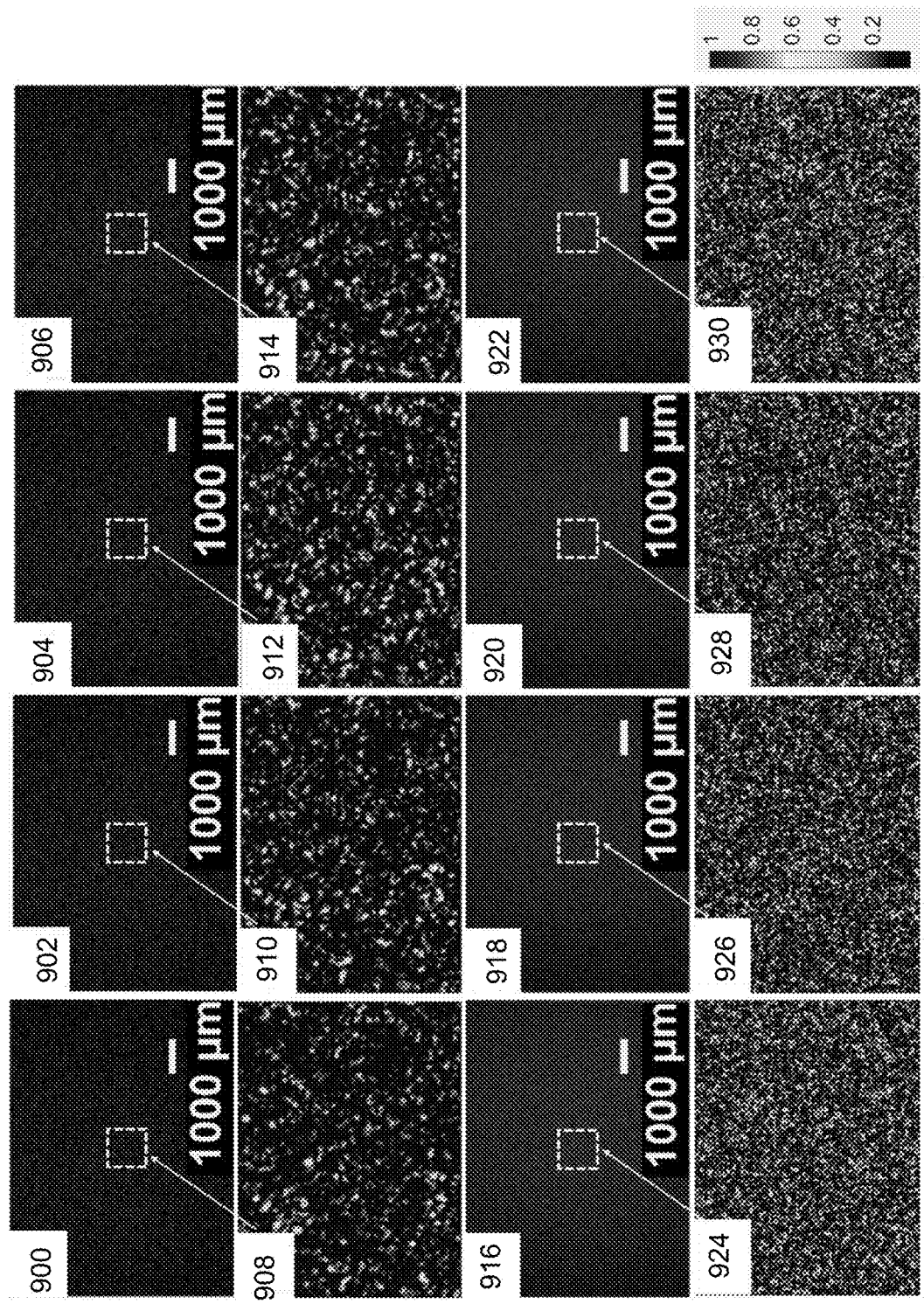
FIGS. 9A-9C illustrates signatures obtained using a SRPE and DRPE system, in accordance with an exemplary embodiment.

FIG. 9A illustrates signatures obtained using a SRPE and DRPE system. In FIG. 9A, 900-906 illustrate a single diffuser sensor signature patterns for 20 μm glass beads, 20 μm polystyrene beads, diatom Tabellaria fenestrate, diatom Synedra, is illustrated. In FIG. 9A, 908-914 illustrate signature patterns in the dashed boxes shown in A-D using the system shown in FIG. 6B and FIG. 6C. In FIG. 9A, 916-922 illustrate signature patterns using the double-random phase encoding scheme for the same micro-objects using the proposed set up in FIG. 6A, FIG. 6D and FIG. 7. In FIG. 9A, 924-930 illustrates the digitally magnified signature patterns in the dashed boxes (100×80 pixels) shown in 916-922 using the system shown in FIG. 6A and FIG. 6D. All the samples can be prepared in deionized water and SRPEad on a microscopic glass slides covered with a thin coverslip.

As a non-limiting example, SRPE and DRPE systems can be implemented using an imaging sensor, Thorlabs DCC1545M monochrome sensor with pixel size of 5.2 microns and sensor size of 6.6 mm×5.3 mm (1280×1024 pixels), and an exposure time of 30 ms. The input light source can be a red laser diode ($\lambda$=635 nm). A video sequence of 50 frames can be recorded and the frames were averaged to reduce any mechanical noise affecting the opto-biological signatures.

Figure 9B:
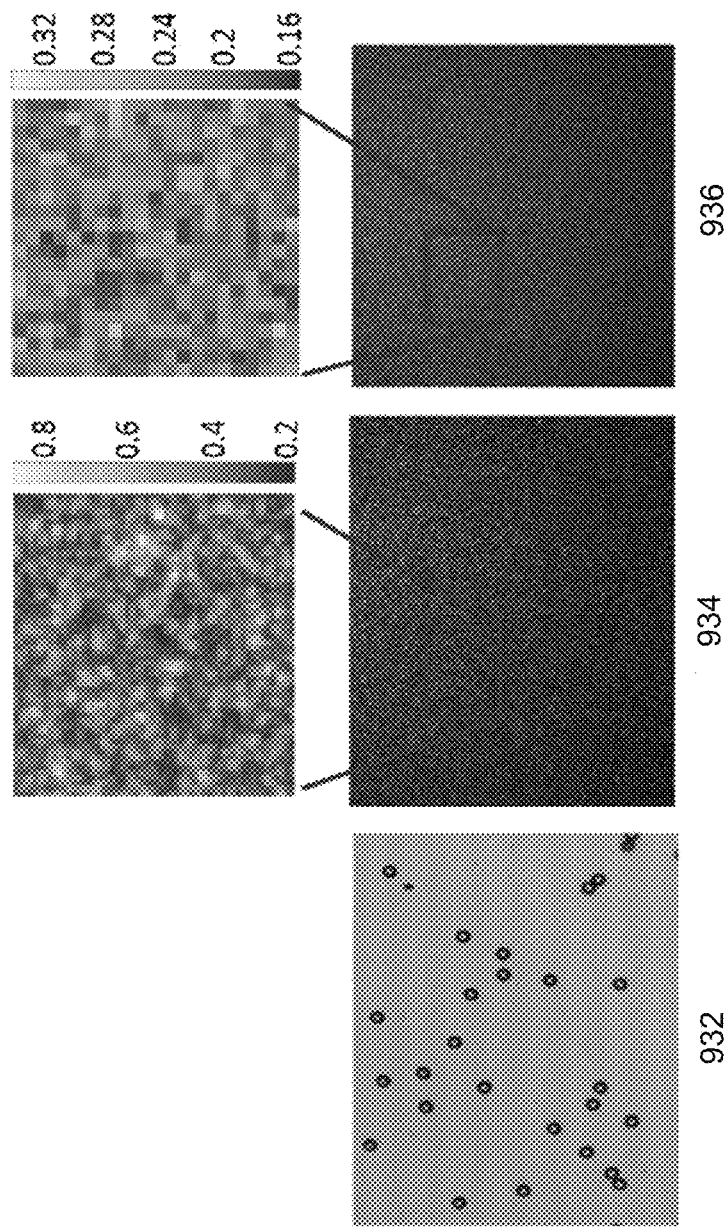

With reference to FIG. 9B, 932 illustrates an example of the randomly distributed 20 µm polystyrene beads that were imaged. In FIG. 9B, 934 is the acquired opto-biological signature for 20 µm polystyrene beads using a SRPE system while 936 is the resulting opto-biological signature using a DRPE system. In addition, enlarged regions of shown in, a and b are depicted to emphasize the differences between the opto-biological signature patterns from the SRPE and DRPE systems.

Figure 9C:
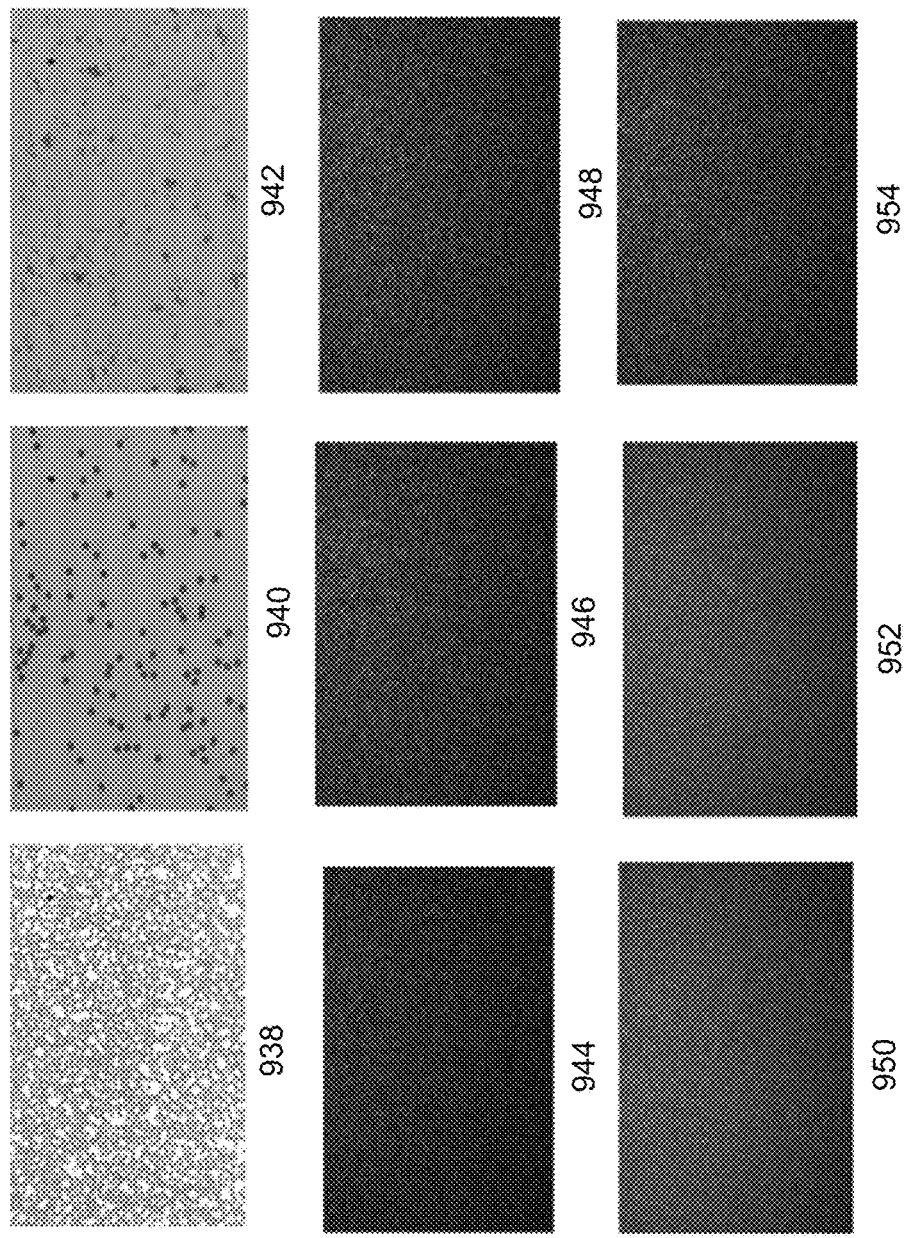

With reference to FIG. 9C, the opto-biological signature for other three micro-objects classes acquired using the SRPE and DRPE systems, is illustrated. In FIG. 9C, 938, 940, and 942 depict the images of red blood cells (fixed slide), 10 µm polystyrene beads, and yeast cells, respectively. Moreover, 944, 946, and 948 show the opto-biological signatures obtained by the SRPE system for each of these three classes, while 950, 952, and 954 show the images of the OBSs obtained using the DRPE system.

The cell identification with good classification accuracies can be obtained using the proposed lens-less system. The single diffuser cell identification sensor generates signature patterns at the sensor plane for various classes of cells using pseudo-random phase encoding. Alternatively, a second diffuser can be placed after a first diffuser which in turn makes the captured signature white and stationary in spatial domain, allowing for robust and high classification accuracies for randomly distributed multiple cells of the same class in the specimen plane.

The autocorrelation of the opto-biological signatures for the SRPE and DRPE systems can be examined One dimensional (1D) notation can be used. In a non-limiting example, both diffuser phase masks can be uncorrelated. In this example, x can represent the spatial domain coordinate, w can represent the frequency coordinates, and $u_0(x) \in C$ can be the complex distribution function representing the input object field arriving at the diffuser plane. The input slide can be placed very close to the diffuser. In addition, $\phi_1(x)$ and $\phi_2(\omega)$ can be random phase functions for the two diffusers which have uniform random distribution in [0, 1]. The diffusers can scatter the light so that the light leaving the diffuser forms a white process. For a single diffuser sensor (SRPE), the autocorrelation ($R_s$) is given by:

$$R_S = E\{u_0(x_1)\exp[j2\pi\phi_1(x_1)]u_0^*(x_2)\exp[-j2\pi\phi_1(x_2)]\} \quad (12)$$
$$= u_0(x_1)u_0^*(x_2)\delta(x_1 - x_2),$$

where E{.} represents the expected value, * denotes complex conjugate, and $u_0(x)\exp[j2\pi\phi_1(x)]$ is the light leaving the first diffuser, and $E\{e^{j2\pi\phi_1(x_1)}e^{-j2\pi\phi_1(x_2)}\}=\delta(x_1-x_2)$.

Based on, Equation 12, the autocorrelation for the single diffuser case can be a white process, but not stationary. In the DRPE system, the second diffuser plane is regarded as satisfying the Fraunhofer domain assumption for diffraction assuming a converging quadratic beam was used by the laser diode. It is assumed that the first diffuser is in close proximity to the input slide, and it is sufficiently separated from the second diffuser $\exp[j2\pi\phi_2(\omega)]$. The distance $z_2$ between the first diffuser and the second diffuser is sufficiently large in the proposed system and so the second diffuser plane can be regarded as being in the Fraunhofer domain. The autocorrelation function ($R_D$) for the double random diffuser case, neglecting constant terms, for the light leaving the second diffuser is given by:

$$R_D = E\{[[U_0(\omega_1) \otimes H_1(\omega_1)]e^{j2\pi\phi_2(\omega_1)}] \quad (13)$$
$$[[U_0^*(\omega_2) \otimes H_1^*(\omega_2)]e^{-j2\pi\phi_2(\omega_2)}]\}$$
$$= E_f\delta(\omega_1 - \omega_2),$$

where $U_0(\omega)$ and $H_1(\omega)$ are the Fourier transforms of the input micro object's complex distribution and the first diffuser, respectively, $\exp[-j2\pi\phi_2(\omega)]$ is the second diffuser transmittance function, $E_f$ is the energy of $U_0(\omega)$, $\otimes$ is the convolution operator, $\delta(.)$ is the delta function.

$$E\{e^{j2\pi\phi_1(x_1)}e^{-j2\pi\phi_1(x_2)}\}=\delta(x_1-x_2), \text{ and}$$

$$E\{H_1(\omega_1-\omega_x)H^*_1(\omega_1-\omega_y)\}=\delta(\omega_x-\omega_y). \quad (14)$$

Based on Eq. 13, the autocorrelation for the double diffuser case is white and wide sense stationary. Therefore, the DRPE system can obtain more robust classification results.

Object recognition can be performed on the opto-biological signature patterns obtained by the proposed system for cell identification and classification. The identification process can be repeated with both the SRPE and the DRPE systems. A total of 11 statistical features, can be extracted globally from the opto-biological signatures in both the space and frequency domains. These features include mean, variance, skewness, kurtosis and entropy. For both the DRPE and SRPE systems, the means of the signatures are robust to object translation. As the resulting signature from the SRPE system is a white, but non-stationary signal, it can be shown that higher order statistical features of the signature such as variance, skewness, and kurtosis are not robust to object translation. However, the statistical features of the signatures from the DRPE system are robust to object translations as the signatures are white and stationary. For both systems, entropy is robust to object translation as the metric does not account for object location. Along with these statistical features, the Pearson correlation coefficient was also calculated between the same class of micro-objects (true class) and between the other classes (false class) by selecting a reference opto-biological signature from the true class opto-biological signature.

The Random Forest classifier was chosen for cell classification. In the first case, wherein all data consisted of multiple cells of a singular class being in the field of view, a dataset was created for the following four classes: 10 µm polystyrene beads, 20 µm polystyrene beads, yeast cells and red blood cells (fixed slide). Fifty opto-biological signatures were captured from each class (i.e. 200 total). Feature extraction was performed and the Random Forest classifier was used for classification. The data was split such that 25 opto-biological signatures from each class were used to train the classifier (total 100), and the remaining were for testing (total 100). Red blood cells (using a fixed slide) were considered true class, and all other classes were considered false class. For the Random Forest model, 100 decision trees were used. The Gini's diversity index criteria, defined as $1-\Sigma_{i=1}^{c} p^2(i)$ where c is the total number of classes and p(i) is the fraction of samples that belong to class i at the node, can be used to form the trees.

Table 3 depicts the confusion matrix for the classifier using the SRPE system for opto-biological signature data acquired for randomly distributed cells of same class. The classifier had an accuracy of 100% which is calculated by (TP+TN)/K, where TP is the number of true positives, TN is the number of true negatives, and K is the total number of test opto-biological signatures. To illustrate the classification capabilities of the DRPE system, similar identification the same micro-objects can be repeated for the DRPE system using the same features as can be used in the SRPE system, resulting in a 100% accuracy, as shown in Table 3.

TABLE 3

Single random phase encoding (SRPE) and Double random phase encoding (DRPE) classification results for same class data using Random Forest (RF) Classifier.

| Random Forest Classifier (SRPE) | | | Random Forest Classifier (DRPE) | | |
|---|---|---|---|---|---|
| | PP | PN | | PP | PN |
| True (actual) | 25 | 0 | True (actual) | 25 | 0 |
| False (actual) | 0 | 75 | False (actual) | 0 | 75 |

(PP: predicted positive, PN: predicted negative)

Additionally, a pure sample of 10 μm polystyrene beads can be considered true class and the two false classes can be a mixture of 10 μm polystyrene beads with 20 μm polystyrene beads (mixture 1) and a mixture of 10 μm polystyrene beads with yeast (mixture 2). Fifty samples can be taken from each of the mixed classes. In addition, the same features can be extracted as can be used in the previous case (i.e. cells in the field of view always consisted of a singular class). Table 4 shows the results, where 100% classification rate can be achieved for the SRPE system and 93% classification rate achieved for the DRPE system.

TABLE 4

Single random phase encoding (SRPE) and Double random phase encoding (DRPE) classification results for same class data using Random Forest (RF) Classifier.

| Random Forest Classifier (SRPE) | | | Random Forest Classifier (DRPE) | | |
|---|---|---|---|---|---|
| | PP | PN | | PP | PN |
| True (actual) | 25 | 0 | True (actual) | 23 | 3 |
| False (actual) | 0 | 50 | False (actual) | 2 | 47 |

(PP: predicted positive, PN: predicted negative)

An important advantage of the SRPE and DRPE cell classification systems over conventional techniques such as digital holographic microscopy (DHM), is that the proposed random phase encoding systems do not require any lenses such as microscope objective lenses. Lenses can be bulky, expensive, and limit the resolution or spatial bandwidth of the system. Also, the disclosed system does not require inverse Fresnel transformation and phase unwrapping to reconstruct the cells which may be computationally expensive. Additionally, the SRPE and DRPE systems can perform cell classification tasks relatively quickly and efficiently (once trained) as they only extract the statistical features from the opto-biological signatures without involving any 3D reconstruction and rendering steps.

As described above, randomly distributed cells, which can be either all of the same class or of mixed classes, can be placed on a slide and illuminated by a light source such as a diode laser source. The object beam then can pass through one diffuser (for SRPE), or two statistically independent random phase masks diffusers (for DRPE). The intensity of the resulting opto-biological signatures from the SRPE and DRPE systems can be recorded using an image sensor. Features can be extracted from the recorded opto-biological signatures and a trained random forest classifier can be used for classification.

FIG. 10 illustrates a process of identifying microscopic objects. In operation 1000, one or more microscopic objects are placed on a slide. In operation 1002, a light source disposed below the slide, laser beam propagates through the one or more microscopic objects disposed on the slide. In operation 1004, one or more diffusers disposed above the slide, encode the beam, in response to the beam passing through the one or more diffusers. In operation 1006, an image sensor disposed above the one or more diffusers captures an optical signature of the encoded beam. In operation 1008, a computing system receives the optical signature of the encoded beam. In operation 1010, the computing system, extracts features from the optical signature. In operation 1012, the computing system identifies the one or more microscopic objects based on the features.

Figure 11:
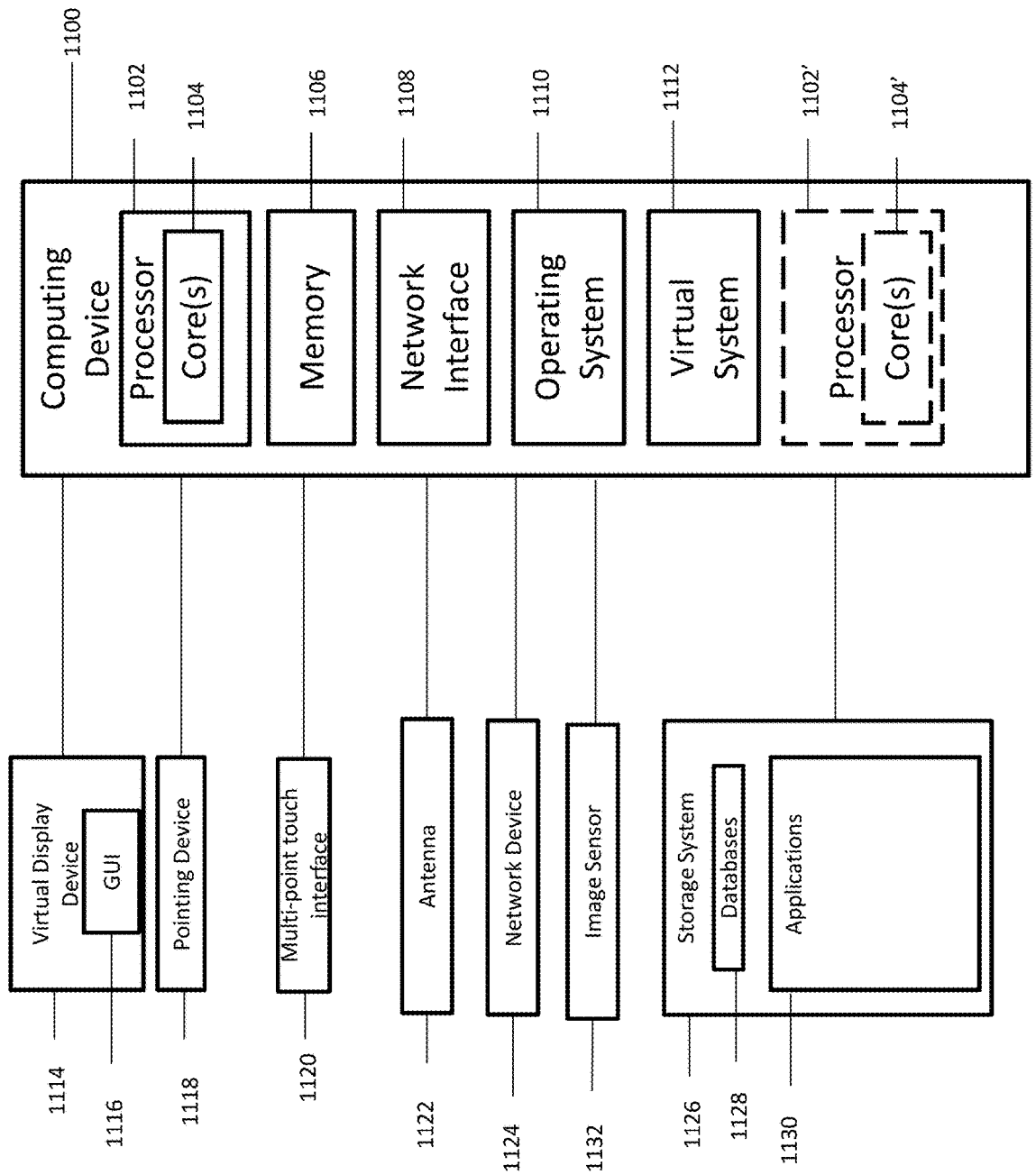
FIG. 11 illustrates an exemplary computing device, in accordance with an exemplary embodiment.

FIG. 11 illustrates an exemplary computing device in accordance with the present disclosure. The computing device 1100 can implement the process of identifying microscopic objects. The computing device 1100 can be a part of the computing system (e.g. computing system 601 as shown in FIGS. 6A-D). The computing device 1100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1106 included in the computing device 1100 may store computer-readable and computer-executable instructions or software (e.g., applications 1130) for implementing exemplary operations of the computing device 1100. The computing device 1100 also includes configurable and/or programmable processor 1102 and associated core(s) 1104, and optionally, one or more additional configurable and/or programmable processor(s) 1102' and associated core (s) 1104' (for example, in the case of computer systems having multiple processors/cores), for executing computer-readable and computer-executable instructions or software stored in the memory 1106 and other programs for implementing exemplary embodiments of the present disclosure. Processor 1102 and processor(s) 1102' may each be a single core processor or multiple core (1104 and 1104') processor. Either or both of processor 1102 and processor(s) 1102' may be configured to execute one or more of the instructions described in connection with computing device 1100.

Virtualization may be employed in the computing device 1100 so that infrastructure and resources in the computing device 1100 may be shared dynamically. A virtual machine 1112 may be provided to handle a process running on multiple processors so that the process appears to be using only one computing resource rather than multiple computing resources. Multiple virtual machines may also be used with one processor.

Memory 1106 may include a computer system memory or random access memory, such as DRAM, SRAM, EDO RAM, and the like. Memory 1106 may include other types of memory as well, or combinations thereof.

A user may interact with the computing device 1100 through a visual display device 1114, such as a computer monitor, which may display one or more graphical user interfaces 1116, multi touch interface 1120, a pointing device 1118, an image sensor 1134 and an reader 1132.

The computing device 1100 may also include one or more storage devices 1126, such as a hard-drive, CD-ROM, or other computer readable media, for storing data and computer-readable instructions and/or software that implement exemplary embodiments of the present disclosure (e.g., applications). For example, exemplary storage device 1126 can include one or more databases 1128. The databases 1128 may be updated manually or automatically at any suitable time to add, delete, and/or update one or more data items in the databases.

The computing device 1100 can include a network interface 1108 configured to interface via one or more network devices 1124 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 1122 to facilitate wireless communication (e.g., via the network interface) between the computing device 1100 and a network and/or between the computing device 1100 and other computing devices. The network interface 1108 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

The computing device 1100 may run any operating system 1110, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 1100 and performing the operations described herein. In exemplary embodiments, the operating system 1110 may be run in native mode or emulated mode. In an exemplary embodiment, the operating system 1110 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A lens-less microscopic object identification system, the system comprising:
   a platform configured to support one or more microscopic objects;
   a light source disposed with respect to the platform, configured to propagate a beam through the one or more microscopic objects disposed on the platform;
   one or more diffusers disposed with respect to the platform, configured to encode spatial frequencies of the one or more microscopic objects in the beam, wherein the encoded beam includes an optical signature of the one or more microscopic objects impressed onto the encoded beam;
   an image sensor disposed with respect to the one or more diffusers, configured to capture the optical signature of the one or more microscopic objects included in the encoded beam; and
   a computing system connected to the image sensor, configured to:
   receive the optical signature of the one or more microscopic objects;
   determine an identity of the one or more microscopic objects by classification based on the optical signature of the one or more microscopic objects,
   wherein the system includes no focusing lens positioned in an optical path of the beam between the light source and the image sensor.

2. The system of claim 1, wherein the one or more microscopic objects are one or more cells.

3. The system of claim 1, wherein the light source is a coherent light source or a partially coherent light source.

4. The system of claim 1, wherein the computing system is further configured to extract a plurality of features from the received optical signature, the plurality of features including one or more selected from a group consisting of mean, variance, skewness, kurtosis, entropy, correlation coefficient, and power spectral density.

5. The system of claim 4, wherein the computing system is configured to determine the identity of the one or more microscopic objects by classification by
   inputting the plurality of features into a pre-trained classifier; and
   receiving as an output of the pre-trained classifier a determined identity of the one or more microscopic objects.

6. The system of claim 1, wherein the one or more diffusers further comprise a first diffuser and a second diffuser positioned in the optical path of the beam between the platform and the image sensor.

7. The system of claim 6, wherein the first diffuser is disposed after the second diffuser and the first and second diffuser are disposed on a cascaded diffuser holder.

8. The system of claim 7, wherein the first diffuser is configured to encode the beam with spatial frequency information of the one or more microscopic objects, generating a pseudo-random phase encoded pattern, in response to the beam passing through the first diffuser.

9. The system of claim 7, wherein the second diffuser is configured to generate a double random phase encoded (DRPE) pattern, in response to the pseudo-random phase encoded pattern passing through the second diffuser.

10. The system of claim 1, wherein the computing system is configured to receive the optical signature by receiving a single image frame of the encoded beam from the image sensor,
wherein the computing system is further configured to extract a plurality of features of the optical signature from the single image frame, and
wherein the computing system is configured to determine the identity of the one or more microscopic objects by classification by
providing the plurality of features extracted from the single image frame as input to a pre-trained classifier trained on the plurality of features, and
receive as output of the pre-trained classified an identification of the one or more microscopic objects.

11. A method for identifying microscopic objects, the method comprising:
supporting, via a platform, one or more microscopic objects;
propagating, via a light source disposed with respect to the platform, a beam through the one or more microscopic objects disposed on the platform;
encoding, via one or more diffusers disposed with respect to the platform, spatial frequencies of the object in the beam, in response to the beam passing through the one or more diffusers, wherein the encoded beam includes an optical signature of the one or more microscopic objects impressed onto the encoded beam;
capturing, via an image sensor disposed with respect to the one or more diffusers, an optical signature of the one or more microscopic objects included in the encoded beam, wherein the beam does not pass through any focusing lens positioned in an optical path of the encoded beam between the light source and the image sensor;
receiving, via a computing system connected to the image sensor, the optical signature of the one or more microscopic objects included in the encoded beam;
extracting, via the computing system, a plurality of features from the optical signature of the one or more microscopic objects; and
determining, via the computing system, an identity of the one or more microscopic objects based on the plurality of features.

12. The method of claim 11, wherein the one or more microscopic objects are one or more cells.

13. The method of claim 11, wherein the light source is a coherent light source or a partially coherent light source.

14. The method of claim 11, wherein extracting the plurality of features includes extracting at least one feature selected from a group consisting of mean, variance, skewness, kurtosis, entropy, correlation coefficient, and power spectral density.

15. The method of claim 11, wherein determining the identity of the one or more microscopic objects based on the plurality of features includes
providing, via the computing system, the plurality of features as input into a pre-trained classifier, and
receiving as an output of the pre-trained classified a determined identity of the one or more microscopic objects.

16. The method of claim 11, wherein the one or more diffusers further comprise a first diffuser and a second diffuser.

17. The method of claim 16, wherein the first diffuser is disposed after the second diffuser and the first and second diffuser are disposed on a cascaded diffuser holder.

18. The method of claim 16, further comprising encoding, via the first diffuser, the beam with spatial frequency information of the one or more microscopic objects, to generate a pseudo-random phase encoded pattern, in response to the beam passing through the first diffuser.

19. The method of claim 18, further comprising generating, via the second diffuser, a double random phase encoded (DRPE) pattern, in response to the pseudo-random phase encoded pattern passing through the second diffuser.

20. A lens-less microscopic object identification system, the system comprising:
a platform configured to support one or more microscopic objects;
a light source disposed with respect to the platform, configured to propagate a beam through the one or more microscopic objects disposed on the platform;
a first diffuser disposed at a first distance with respect to the platform, configured to encode a pseudo-random encoded pattern of the one or more microscopic objects in the beam in response to the beam passing through the first diffuser;
a second diffuser disposed at a second distance with respect to the first diffuser, configured to receive the beam encoded with the pseudo-random encoded pattern of the one or more microscopic objects and encode a double random encoded pattern of the one or more microscopic objects in the beam, in response to the passing through the second diffuser, wherein the double random encoded pattern is an optical signature of the one or more microscopic objects;
an image sensor disposed at a third distance with respect to the second diffuser, configured to capture the optical signature of the one or more microscopic objects included in the encoded beam; and
a computing system connected to the image sensor, configured to:
receive the optical signature of the one or more microscopic objects;
determine an identity of the one or more microscopic objects by classification based on the optical signature of the one or more microscopic objects,
wherein the system includes no focusing lens positioned in an optical path of the beam between the light source and the image sensor.

* * * * *